US009593779B2

(12) United States Patent
Strand et al.

(10) Patent No.: US 9,593,779 B2
(45) Date of Patent: Mar. 14, 2017

(54) BALL VALVE

(71) Applicant: FJELL SUBSEA PRODUCTS AS, Kokstad (NO)

(72) Inventors: Asbjørn Strand, Nesttun (NO); Kristian Karlsen, Stanghelle (NO)

(73) Assignee: FJELL SUBSEA PRODUCTS AS (NO)

( * ) Notice: Subject to any disclaimer, the term of this patent is extended or adjusted under 35 U.S.C. 154(b) by 0 days.

(21) Appl. No.: 14/713,845

(22) Filed: May 15, 2015

(65) Prior Publication Data
US 2015/0337968 A1    Nov. 26, 2015

(51) Int. Cl.
| F16K 5/00 | (2006.01) |
| F16K 5/06 | (2006.01) |
| F16K 1/42 | (2006.01) |
| F16K 5/20 | (2006.01) |
| B23P 15/00 | (2006.01) |
| F16J 3/04 | (2006.01) |

(52) U.S. Cl.
CPC .............. *F16K 5/06* (2013.01); *B23P 15/001* (2013.01); *F16J 3/047* (2013.01); *F16K 5/0689* (2013.01); *F16K 5/0694* (2013.01); *F16K 5/201* (2013.01); *F16K 5/207* (2013.01); *Y10T 29/49426* (2015.01)

(58) Field of Classification Search
CPC ........ F16K 5/207; F16K 5/0689; F16K 5/205; F16K 27/067; F16K 3/0236; F16K 5/0285; F16K 5/0485; F16K 5/0694; F16K 5/0668; F16K 5/0673; F16K 5/0678; F16K 41/10; F16K 41/106
USPC ....... 251/176, 177, 178, 180, 181, 185, 192, 251/175, 359, 360, 362, 364, 251/315.01–315.16, 314, 316, 317; 137/15.18–15.26
See application file for complete search history.

(56) References Cited

U.S. PATENT DOCUMENTS

| 2,777,664 A | * | 1/1957 | Bryant | F16K 3/0236 251/174 |
| 3,204,924 A | * | 9/1965 | Bredtschneider | F16K 3/0236 251/172 |
| 3,218,024 A | * | 11/1965 | Kroekel | F16K 31/1635 251/172 |

(Continued)

FOREIGN PATENT DOCUMENTS

| DE | 4209356 A1 | * | 9/1993 | ........... F16K 5/0636 |
| DE | 202006010374 | | * 12/2007 | ............... F16K 5/06 |

*Primary Examiner* — Mary McManmon
*Assistant Examiner* — Hailey K Do
(74) *Attorney, Agent, or Firm* — Maschoff Brennan

(57) ABSTRACT

Disclosed herein is a bellow for use in a ball valve, the bellow comprising: a metallic seat at an end of the bellow for providing a contact surface with a ball of a ball valve; and a metallic body integral with the seat; wherein the metallic body has a longitudinally elastic property such that, when the bellow is in use in a ball valve and the bellow is arranged within the housing of the ball valve so that it is always under longitudinal compression, substantially only the compression in the bellow causes the seat to apply a sealing force against the ball of the ball valve that maintains a mechanical seal between the seat and the ball valve. Advantageously, embodiments allow a new design of ball valve that maintains a high standard of performance in subsea environments over long time periods.

13 Claims, 24 Drawing Sheets

(56) References Cited

U.S. PATENT DOCUMENTS

| | | | | |
|---|---|---|---|---|
| 4,217,923 | A | * | 8/1980 | Kindersley ........... F16K 5/0636 137/315.21 |
| 8,496,226 | B2 | * | 7/2013 | Dalluge ................ F16K 5/0636 251/159 |
| 8,794,593 | B2 | * | 8/2014 | Kahn .................... F16K 3/0227 251/195 |
| 2008/0182114 | A1 | * | 7/2008 | Kim ......................... C23C 4/04 428/469 |
| 2014/0319395 | A1 | * | 10/2014 | Warbey ................. F16K 5/0678 251/185 |

* cited by examiner

| valve size | | 1/2" | 1" | 2" | 4" | 6" | 8" | 12" | 16" | 24" | 36" | 42" |
|---|---|---|---|---|---|---|---|---|---|---|---|---|
| bore nominal diameter, $D$ | mm | 9,5 | 25,4 | 50,8 | 102 | 152 | 203 | 305 | 406 | 610 | 914 | 1067 |
| radius of ball, $r_b$ | mm | 9,5 | 25,4 | 50,8 | 76 | 114 | 152 | 229 | 305 | 457 | 686 | 800 |
| stem bushing radius, $r_s$ | mm | 5 | 9 | 18 | 33 | 39 | 51 | 76 | 78 | 115 | 133 | 155 |
| width of seat/ball contact surface, $a_s$ | mm | 1,2 | 2,0 | 2,8 | 4,0 | 4,9 | 5,7 | 6,9 | 8,0 | 9,8 | 12,0 | 13,0 |
| angular position contact surface, $\theta$ | deg | 43 | 38 | 35 | 48 | 47 | 46 | 45 | 45 | 44 | 44 | 44 |
| valve pressure class | | 20 kpsi | | 10 kpsi | | ASME 2500# | | | ASME 1500# | | ASME 900# | |
| typical application | | subsea hydraulic | | other subsea service | | | | oil&gas and chemical industry | | | | |
| design pressure, $P$ | MPa | 138 | 69 | 69 | 69 | 42 | 42 | 42 | 42 | 42 | 15 | 15 |
| maximum seat surface load, $\sigma_N$ | N/mm² | 25 | 25 | 25 | 20 | 15 | 15 | 15 | 10 | 25 | 5 | 5 |
| pretension force, $F$ | N | 914 | 3 861 | 10 652 | 19 059 | 26343 | 40602 | 74 632 | 76601 | 140675 | 129146 | 162704 |
| expected CNC tolerances, $\pm \delta L$ | mm | 0,010 | 0,013 | 0,017 | 0,027 | 0,036 | 0,045 | 0,063 | 0,081 | 0,118 | 0,173 | 0,200 |
| bellow pre - compression, $\Delta L$ | mm | 0,050 | 0,064 | 0,087 | 0,133 | 0,178 | 0,224 | 0,315 | 0,407 | 0,589 | 0,863 | 1,000 |
| bellow spring coefficient, $K$ | N/mm | 18 279 | 60 073 | 122 318 | 143 591 | 147680 | 181238 | 236692 | 188392 | 238760 | 149636 | 162704 |
| torque non - pressurised, $T_{NP}$ | Nm | 6 | 78 | 441 | 975 | 2067 | 4299 | 12022 | 16587 | 46121 | 63987 | 94277 |
| torque full differential pressure, $T_{FP}$ | Nm | 28 | 200 | 1 269 | 6 651 | 10953 | 24665 | 78031 | 86710 | 275983 | 415977 | 648784 |
| ISO 13628 - 8 ROV torque class | | 1 | 2 | 3 | 5 | 6 | 7 | na. | na. | na. | na. | na. |
| ISO 13628 - 8 max design torque | Nm | 67 | 271 | 1 355 | 6 779 | 13558 | 33895 | na. | na. | na. | na. | na. |

*FIG. 4A*

| Valve nominal size | | 3/8" - 1" | | 2" - 6" | | 8" - 16" | | 18" - 42" | |
|---|---|---|---|---|---|---|---|---|---|
| | | min. | max. | min. | max. | min. | max. | min. | max. |
| Bore diameter | mm | 9.5 | 25.4 | 25.4 | 102 | 203 | 406 | 457 | 1067 |
| Design pressure | bar | 420 | 1378 | 420 | 690 | 100 | 420 | 100 | 420 |
| Bellow wall thickness | mm | 0.4 | 3.5 | 1.1 | 7.0 | 2.0 | 17 | 4.6 | 45 |
| Bellow pre compression | mm | 0.3 | 0.1 | 0.5 | 0.2 | 1 | 0.5 | 2 | 0.5 |
| Bellow spring coefficient | kN/mm | 3 | 50 | 10 | 645 | 20 | 225 | 6.7 | 1000 |
| Bellow sealing force | N | 1,000 | 5,000 | 5,000 | 129,000 | 20,000 | 112,500 | 13,400 | 500,000 |
| Ball O/C torque non-pressurised | Nm | 8 | 80 | 180 | 13,800 | 3,000 | 30,000 | 4,300 | 350,000 |
| Ball O/C torque full diff. pressure | Nm | 10 | 271 | 500 | 33,895 | 5,000 | 200,000 | 32,000 | 3,300,000 |

FIG. 4B

| Temperature | | 0.2% Yield Strength | | Tensile Strength | | % Elongation 2" |
|---|---|---|---|---|---|---|
| °F | °C | ksi | MPa | ksi | MPa | |
| 200 | 93 | 170 | 1172 | 204 | 1407 | 21.0 |
| 400 | 204 | 163 | 1124 | 198 | 1365 | 20.0 |
| 600 | 316 | 159 | 1096 | 195 | 1344 | 20.0 |
| 800 | 427 | 156 | 1076 | 191 | 1317 | 19.0 |
| 1000 | 538 | 155 | 1069 | 185 | 1276 | 18.0 |
| 1200 | 649 | 149 | 1027 | 168 | 1158 | 19.0 |
| 1400 | 760 | 110 | 758 | 110 | 758 | 27.0 |

| Temperature C | Young's Modulus MPa | Poisson's Ratio | Bulk Modulus MPa | Shear Modulus MPa |
|---|---|---|---|---|
| | 1.94E+05 | 0.31 | 1.70E+05 | 73947 |

| time | length mm | Force N | Stress Mpa | Pressure Mpa |
|---|---|---|---|---|
| 1 | -0.25 | -6700.9 | 750.56 | 0 |
| 2 | -0.25 | -6606.8 | 1185.8 | 69 |
| 3 | -0.225 | -5936.7 | 1124.4 | 69 |
| 4 | -0.2 | -5266.6 | 1066.5 | 69 |
| 5 | -0.175 | -4596.5 | 1009 | 69 |
| 6 | -0.15 | -3926.5 | 952.02 | 69 |
| 7 | -0.125 | -3256.4 | 916.49 | 69 |
| 8 | -0.1 | -2586.3 | 881.9 | 69 |
| 9 | -0.075 | -1916.2 | 850.76 | 69 |
| 10 | -0.050 | -1246.1 | 836.3 | 69 |
| 11 | -0.050 | -1340.2 | 150.11 | 0 |

| time | length mm | Force N | Stress Mpa | Pressure Mpa |
|---|---|---|---|---|
| 2 | -0.25 | -6700.9 | 750.56 | 0 |
| 3 | -0.225 | -6030.8 | 675.5 | 0 |
| 4 | -0.2 | -5360.7 | 600.45 | 0 |
| 5 | -0.175 | -4690.6 | 525.39 | 0 |
| 6 | -0.15 | -4020.5 | 450.33 | 0 |
| 7 | -0.125 | -3350.4 | 375.28 | 0 |
| 8 | -0.1 | -2680.3 | 300.22 | 0 |
| 9 | -0.075 | -2010.300 | 225.17 | 0 |
| 10 | -0.050 | -1340.200 | 150.11 | 0 |

| time | length mm | Force N | Stress Mpa | Pressure Mpa |
|---|---|---|---|---|
| 1 | -0.25 | -6700.9 | 750.56 | 0 |
| 2 | -0.25 | -6677.2 | 1160.8 | 69 |
| 3 | -0.225 | -6007.2 | 1100.1 | 69 |
| 4 | -0.2 | -5337.1 | 1039.7 | 69 |
| 5 | -0.175 | -4667 | 979.54 | 69 |
| 6 | -0.15 | -3996.9 | 919.73 | 69 |
| 7 | -0.125 | -3326.8 | 860.32 | 69 |
| 8 | -0.1 | -2656.7 | 815.74 | 69 |
| 9 | -0.075 | -1986.6 | 830.24 | 69 |
| 10 | -0.050 | -1316.6 | 844.74 | 69 |
| 11 | -0.050 | -1340.2 | 150.11 | 0 |

| time | length mm | Force N | Stress Mpa | Pressure Mpa |
|---|---|---|---|---|
| 1 | -0.12 | -3984.2 | 433.76 | 0 |
| 2 | -0.12 | -3985.6 | 1029 | 69 |
| 3 | -0.11 | -3653.6 | 1005.7 | 69 |
| 4 | -0.1 | -3321.6 | 982.48 | 69 |
| 5 | -0.09 | -2989.6 | 959.23 | 69 |
| 6 | -0.08 | -2657.6 | 935.99 | 69 |
| 7 | -0.07 | -2325.5 | 912.75 | 69 |
| 8 | -0.06 | -1993.5 | 889.51 | 69 |
| 9 | -0.05 | -1661.5 | 866.28 | 69 |
| 10 | -0.04 | -1329.5 | 843.05 | 69 |
| 11 | -0.04 | -1328.1 | 144.59 | 0 |

| time | length mm | Force N | Stress Mpa | Pressure Mpa |
|---|---|---|---|---|
| 2 | -0.12 | -3984.2 | 433.76 | 0 |
| 3 | -0.11 | -3652.2 | 397.61 | 0 |
| 4 | -0.1 | -3320.2 | 361.46 | 0 |
| 5 | -0.09 | -2988.1 | 325.32 | 0 |
| 6 | -0.08 | -2656.1 | 289.17 | 0 |
| 7 | -0.07 | -2324.1 | 253.02 | 0 |
| 8 | -0.06 | -1992.1 | 216.88 | 0 |
| 9 | -0.05 | -1660.1 | 180.73 | 0 |
| 10 | -0.04 | -1328.1 | 144.59 | 0 |

| time | length mm | Force N | Stress Mpa | Pressure Mpa |
|---|---|---|---|---|
| 1 | -0.18 | -19076 | 295.84 | 0 |
| 2 | -0.18 | -19170 | 1109.1 | 69 |
| 3 | -0.17 | -18110 | 1101.4 | 69 |
| 4 | -0.16 | -17050 | 1093.8 | 69 |
| 5 | -0.15 | -15990 | 1086.2 | 69 |
| 6 | -0.14 | -14931 | 1078.6 | 69 |
| 7 | -0.13 | -13871 | 1071 | 69 |
| 8 | -0.12 | -12811 | 1063.3 | 69 |
| 9 | -0.11 | -11751 | 1055.7 | 69 |
| 10 | -0.1 | -10691 | 1048.1 | 69 |
| 11 | -0.1 | -10598 | 164.35 | 0 |

| time | length mm | Force N | Stress Mpa | Pressure Mpa |
|---|---|---|---|---|
| 2 | -0.18 | -19076 | 295.84 | 0 |
| 3 | -0.17 | -18017 | 279.4 | 0 |
| 4 | -0.16 | -16957 | 262.97 | 0 |
| 5 | -0.15 | -15897 | 246.53 | 0 |
| 6 | -0.14 | -14837 | 230.1 | 0 |
| 7 | -0.13 | -13777 | 213.66 | 0 |
| 8 | -0.12 | -12718 | 197.23 | 0 |
| 9 | -0.11 | -11658 | 180.79 | 0 |
| 10 | -0.1 | -10598 | 164.35 | 0 |

| time | length mm | Force N | Stress Mpa | Pressure Mpa |
|---|---|---|---|---|
| 1 | -0.44 | -140370 | 126.39 | 0 |
| 2 | -0.44 | -140280 | 642.67 | 25 |
| 3 | -0.42 | -133900 | 639.33 | 25 |
| 4 | -0.4 | -127520 | 635.99 | 25 |
| 5 | -0.38 | -121140 | 632.65 | 25 |
| 6 | -0.36 | -114760 | 629.31 | 25 |
| 7 | -0.34 | -108380 | 625.97 | 25 |
| 8 | -0.32 | -102000 | 622.63 | 25 |
| 9 | -0.3 | -95616 | 619.29 | 25 |
| 10 | -0.28 | -89235 | 615.95 | 25 |
| 11 | -0.28 | -89325 | 80.432 | 0 |

| time | length mm | Force N | Stress Mpa | Pressure Mpa |
|---|---|---|---|---|
| 2 | -0.44 | -140370 | 126.39 | 0 |
| 3 | -0.42 | -133990 | 120.65 | 0 |
| 4 | -0.4 | -127610 | 114.9 | 0 |
| 5 | -0.38 | -121230 | 109.16 | 0 |
| 6 | -0.36 | -114850 | 103.41 | 0 |
| 7 | -0.34 | -108470 | 97.667 | 0 |
| 8 | -0.32 | -102090 | 91.922 | 0 |
| 9 | -0.3 | -95706 | 86.177 | 0 |
| 10 | -0.28 | -89325 | 80.432 | 0 |

BALL VALVE

FIELD

The present invention relates to the design of ball values and manufacture thereof. An embodiment provides a new design of bellow for use in a ball valve that applies an appropriate force against the ball of the ball valve to maintain a mechanical seal under all operating conditions. The ball valves according to embodiments are particularly suited to applications in the oil and gas industry. Advantageously, the ball valves are able to maintain a high standard of performance over a long period of time.

BACKGROUND

Ball valves are a well known type of valve. In a standard ball valve, a spherical ball is supported by a housing. The ball is able to rotate within the housing. The housing has inlet and outlet ports of a bore that is provided through the housing. The ball is positioned within the path of the bore through the housing. The ball has a straight cylindrical bore through it. When the valve is open, the bore through the ball is positioned relative to the bore through the housing such that a fluid is able to flow into the inlet port of the housing, through the bore of the ball and out of the outlet port of the housing. To close the valve the ball is rotated within the housing such that there is no fluid communication between the bore of the ball and the bore through the housing. For a standard ball valve, a rotation of the ball within the housing of 90 degrees changes the valve between the fully open and fully closed states. Within the ball valve, two seats in the housing provide the contact areas around the bore with the ball. When the valve is closed, it is necessary for the contact between the seats and the ball to provide a seal to ensure that substantially no fluid that flows into the inlet of the housing is able to flow to the outlet of the housing or leak in or out of the housing. When the valve is open, the fluid should flow through the bore from the inlet to the outlet, but this should be the only flow path for the fluid and no fluid should leak in or out of the housing.

Some applications of ball valves require a high standard of performance under demanding conditions. For example, some subsea applications in the oil and gas industry require seals that maintain a low leakage risk of fluid over a 40 year time period. The seal should function at extremely high and low temperatures with a wide range of hydraulic fluids, chemicals and well formation liquids that can comprise a mixture of oil, gas, water and sand.

In addition, the torque required to operate the valve should be maintained within strict limits. The opening and closing of subsea valves is normally performed by remote operated vehicles, ROVs, and the torque required to rotate the ball of the ball valve should therefore never exceed the maximum torque that can be applied by an ROV.

Known designs of ball valve have a high risk of failing to maintain low leakage requirements over a long time period in subsea applications. In order to maintain the seal between the seat and the ball valve, it is necessary for a positive pressure to be applied by each of the seats against the ball. It is known for the seat to be made of an polymeric material, such as the theroplastcs polytetrafluoroethylene (PTFE) and nitrile butadiene (NBR). The polymeric material is pressed into the ball to seal the contact. However, such polymeric seals are not suitable for long term use with certain types of fluid over a long time period or extremely high or low temperatures. In particular, dirty, or abrasive, fluids comprising sand are extremely detrimental to polymeric seals. Accordingly, polymeric seals that are in contact with well fluids have a high probability of failing in subsea applications and are not reliable.

There are known ball valves that have metal seats and a metal-to-metal seal is provided between the seat and the ball. These designs of ball valve provide a seat that is suitable for use with abrasive/dirty fluids, and at extreme temperatures, over long time periods. An example of a ball valve with metal seats is the 9800 Series by J Flow Controls, http://www.jflowcontrols.com/assets/downloads/Flanged-9800.pdf (viewed on 11 May 2015). A spring is provided behind the seats to force the seats against the ball and maintain a mechanical seal. A polymeric seal is still required between the seat, which is moveable by the spring, and the housing of the ball valve. Another problem is that the mechanical seal between the seat and the ball is not perfect and there is a small amount of fluid leakage through the seal. A secondary sealing system is therefore required. The use of polymeric materials and springs in the ball valve increases the likelihood of failure over long time periods and also complicates the design and manufacture of the valve.

Accordingly, there is a need to improve on known designs of ball valve, in particular for use in subsea applications.

STATEMENTS OF INVENTION

According to a first aspect, there is provided a bellow for use in a ball valve, the bellow comprising: a metallic seat at an end of the bellow for providing a contact surface with a ball of a ball valve; and a metallic body integral with the seat; wherein the metallic body has a longitudinally elastic property such that, when the bellow is in use in a ball valve and the bellow is arranged within the housing of the ball valve so that it is always under longitudinal compression, substantially only the compression in the bellow causes the seat to apply a sealing force against the ball of the ball valve that maintains a mechanical seal between the seat and the ball valve.

Preferably, the bellow comprises an integral plug, at the opposite end of the bellow to the seat, the plug being Electron Beam or laser weldable to the exterior of the housing of a ball valve; and, optionally, wherein the bellow is made from an austenite nickel-chromium-based superalloy; and, optionally, wherein the seat is coated with tungsten carbide with a surface roughness of less than or equal to 0.2-0.3 micron Ra; and, optionally, wherein the sealing force is maintained at 900 N or more under all operating conditions of the ball valve; and, optionally, wherein the spring co-efficient of the bellow is 16500 N/mm or less; and, optionally, wherein the spring co-efficient of the bellow is 20000 N/mm or less; and, optionally, wherein the spring co-efficient of the bellow is 15000 N/mm or more; and, optionally, wherein the longitudinal compression reduces the length of the bellow by at least 0.05 mm; and optionally, wherein the body is wavelike and configured such that, when fluid flows through the bellow, an even positive pressure is applied by the seat.

Preferably, a cross-section of the bellow comprises a series of linear sections connected to each other by 90 degree turns, wherein the thickness of a linear section aligned along the longitudinal axis of the bellow is 1.5 mm, the thickness of a linear section aligned perpendicular to the longitudinal axis of the bellow is 1.2 mm, the spacing between linear sections aligned perpendicular to the longitudinal axis of the bellow is 2 mm and the spacing between linear sections aligned along the longitudinal axis of the bellow is 4 mm.

First and second bellows according to the first aspect wherein, when in use in a ball valve such that the seats of the bellows are in contact with opposite sides of the ball of the ball valve, the bellows are compressed such that the compression in the bellows alone causes the seats to apply a force against the ball valve that maintains a mechanical seal between each seat and the ball valve and the torque required to rotate the ball of the ball valve is no more than 400 Nm under all operating conditions of the ball valve.

According to a second aspect there is provided a method of manufacturing a ball valve, the method comprising: positioning the ball of a ball valve in the housing of the ball valve; positioning a first metallic bellow in the housing such that a metallic seat at a first end of the first bellow is in contact with a first side of the ball, wherein the first bellow has a longitudinally elastic property and the seat of the first bellow is integral with the body of first bellow; positioning a second metallic bellow in the housing such that a metallic seat at a first end of the second bellow is in contact with a second side of the ball, wherein the second bellow has a longitudinally elastic property and the seat of the second bellow is integral with the body of second bellow; applying a force that compresses the first and second bellows; and welding the second ends of the first and second bellows to the housing when the first and second bellows are under compression, such that, when welded, substantially only the compression of the first and second bellows causes the seats of the first and second bellows to apply a sealing force against the ball; and said sealing force maintains a mechanical seal between each seat and the ball.

Preferably, the method further comprises: positioning a third metallic bellow in the housing such that a metallic seat at a first end of the first bellow is in contact with a third side of the ball, wherein the third bellow has a longitudinally elastic property and the seat of the third bellow is integral with the body of third bellow; positioning a fourth metallic bellow in the housing such that a metallic seat at a first end of the fourth bellow is in contact with a fourth side of the ball, wherein the fourth bellow has a longitudinally elastic property and the seat of the fourth bellow is integral with the body of fourth bellow; applying a force that compresses the third and fourth bellows; and welding the second ends of the third and fourth bellows to the housing when the third and fourth bellows are under compression, such that, when welded, substantially only the compression of the third and fourth bellows causes the seats of the third and fourth bellows to apply a second sealing force against the ball; and said second sealing force maintains a mechanical seal between each seat of the third and fourth bellows and the ball; wherein the first and second bellows are arranged co-linearly with each other; the third and fourth bellows are arranged co-linearly with each other; and the longitudinal axes of the third and fourth bellows are perpendicular to the longitudinal axes of the first and second bellows.

Preferably, the method further comprises: turning the ball of the ball valve when the first and second bellows are under compression; and determining to weld the first and second bellows to the housing in dependence on the torque required to turn the ball valve.

Preferably, the method further comprises: repeatedly changing the applied force to compress the first and second bellows and measuring the torque require to turn the ball of the ball valve until the measured torque has a predetermined value.

Preferably, the method further comprises: turning the ball of the ball valve when the third and fourth bellows are under compression; and determining to weld the third and fourth bellows to the housing in dependence on the torque required to turn the ball valve.

Preferably, the method further comprises: repeatedly changing the applied force to compress the third and fourth bellows and measuring the torque require to turn the ball of the ball valve until the measured torque has a predetermined value.

Preferably, the third and fourth bellows are positioned in the housing and compressed prior to the first and second bellows being positioned in the housing and compressed; and, optionally, wherein the welding is Electron Beam or laser welding; and, optionally, wherein the ball of the ball valve is rotatable by a torque of 400 Nm or less under all operating conditions of the ball valve; and, optionally, wherein the sealing force applied by the first and second bellows is 900 N or more.

Preferably, other than the bellows, the method does not comprise providing any other components in the housing for contributing to the applied sealing force between the seats of the first and second bellows and the ball.

Preferably, the first bellow is a bellow according to the first aspect and the second bellow is a bellow according to the first aspect.

According to a third aspect, there is provided a ball valve manufactured according to the method of the second aspect.

According to a fourth aspect, there is provided a ball valve comprising: an inlet and an outlet with a flow path for fluid therebetween; a rotatable ball positioned in the flowpath, wherein the flow of fluid along the flowpath is dependent on the rotation of the ball; a first bellow arranged between the inlet and the ball, wherein the first bellow is a bellow according to the first aspect and is fixed in the housing under compression so that a mechanical seal is maintained between the seat of the first bellow and the ball; and a second bellow arranged between the outlet and the ball, wherein the second bellow is a bellow according to the first aspect and is fixed in the housing under compression so that a mechanical seal is maintained between the seat of the second bellow and the ball.

Preferably, the only manufactured components in the housing of the ball valve that are configured to force the seats of the first and second bellows against the ball are the first and second bellows.

Preferably the ball valve further comprises: a stem that extends from first and second sides of the ball; a third bellow arranged around the stem extending from the first side of the ball, wherein third bellow has an integral seat in contact with the ball; and a fourth bellow arranged around the stem extending from the second side of the ball, wherein fourth bellow has an integral seat in contact with the ball; wherein the third and fourth bellows have longitudinally elastic properties and are fixed in the housing under compression such that the compression in the third and fourth bellows ensures a mechanical seal between the seats of the third and fourth bellows and the ball.

Preferably, at least the third bellow comprises a seal between the stem and a plug of the third bellow and the stem extends through the seal out of the housing; wherein the seal is arranged in the housing so that fluid from the main flow path can only reach the seal if the fluid leaks across at least the mechanical seal between the seat of the third bellow and the ball.

Preferably, the seal is a polymeric material; and, optionally, wherein the housing, bellows and ball are made from an austenite nickel-chromium-based superalloy; and optionally, wherein the bellows are fixed to the housing by Electron Beam or laser welding.

Preferably, the torque required to rotate ball is 400 Nm or less under all operating conditions of the ball valve.

LIST OF FIGURES

Embodiments of the present invention will now be described in detail, by way of example only, with reference to the accompanying drawings, in which.

Figure 5:
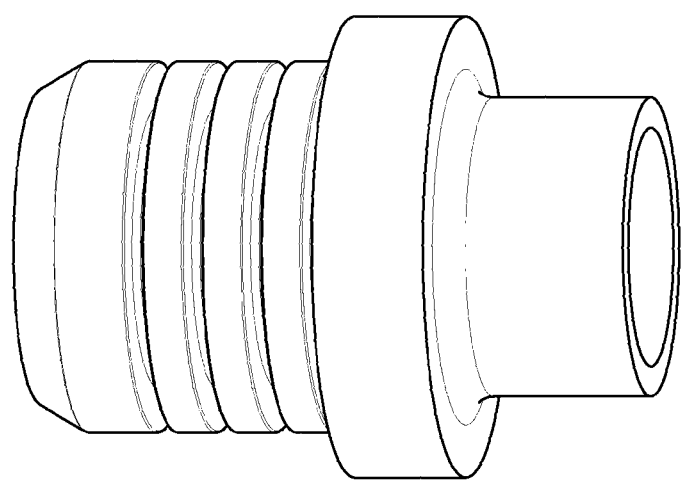
Figure 6:
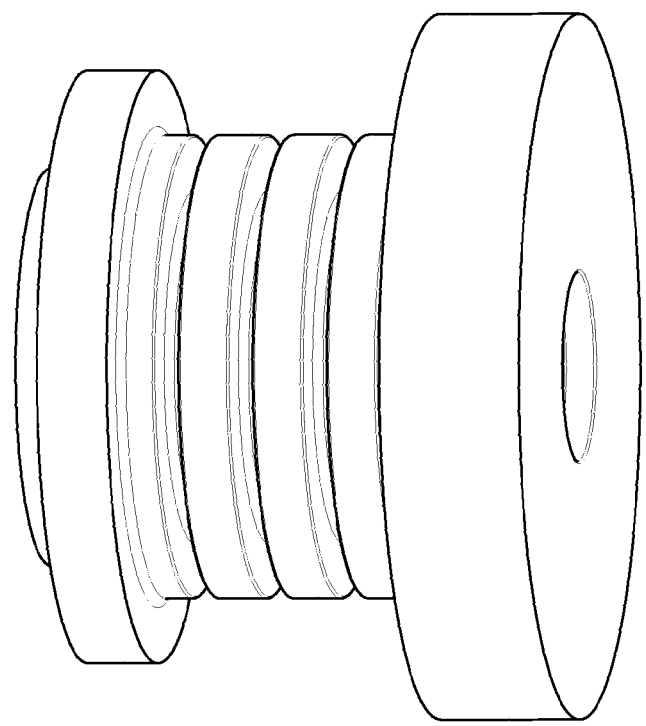
Figure 7:
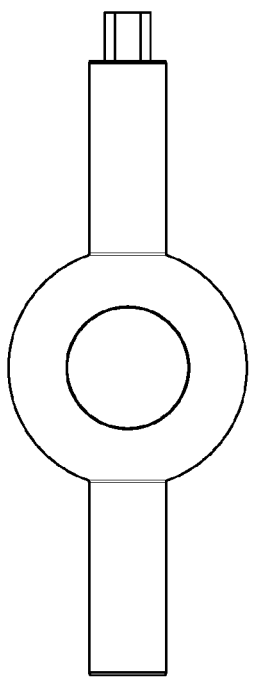
Figure 8:
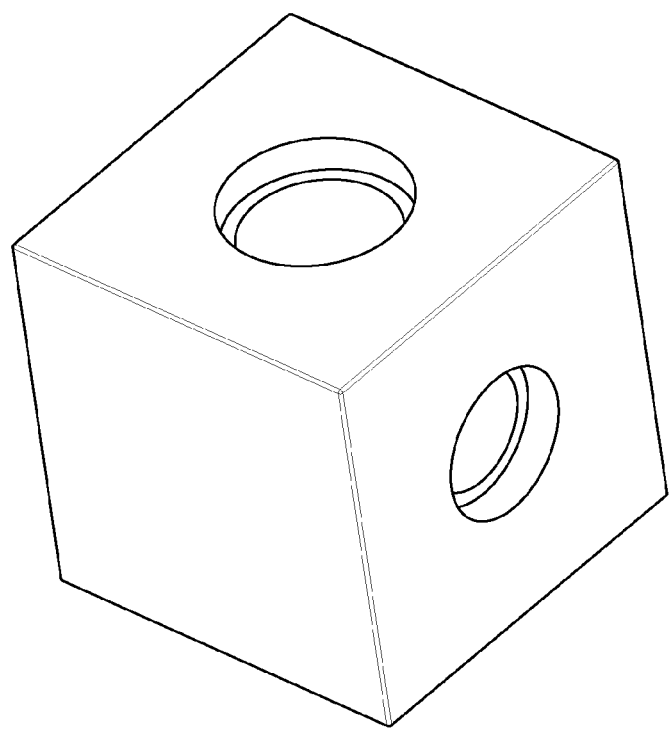
Figure 9:
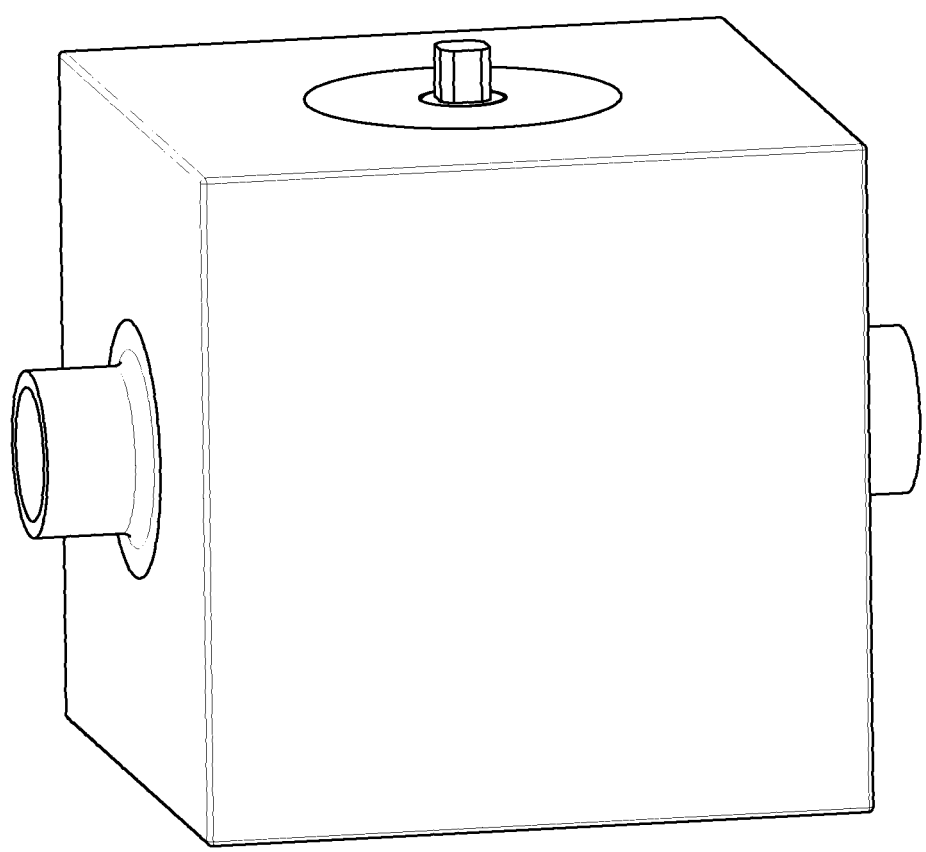
Figures 10A, 10B, 10C:
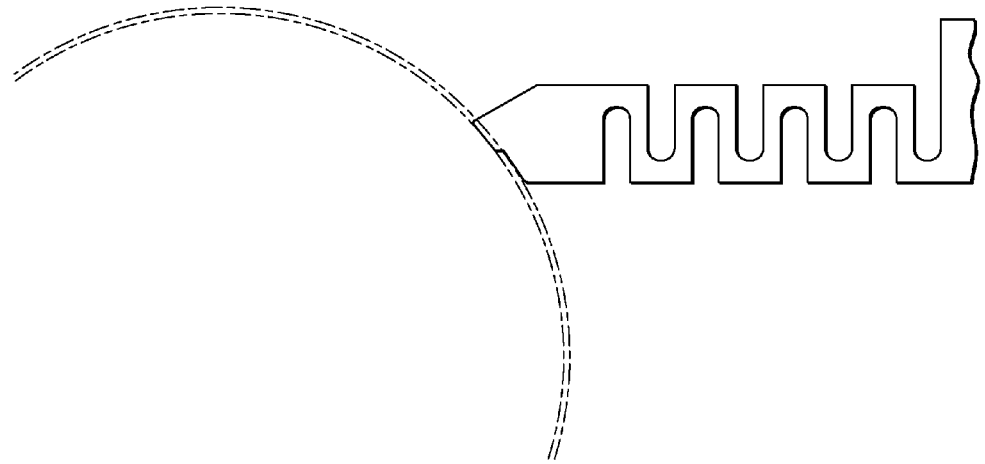
Figures 10D, 10E:
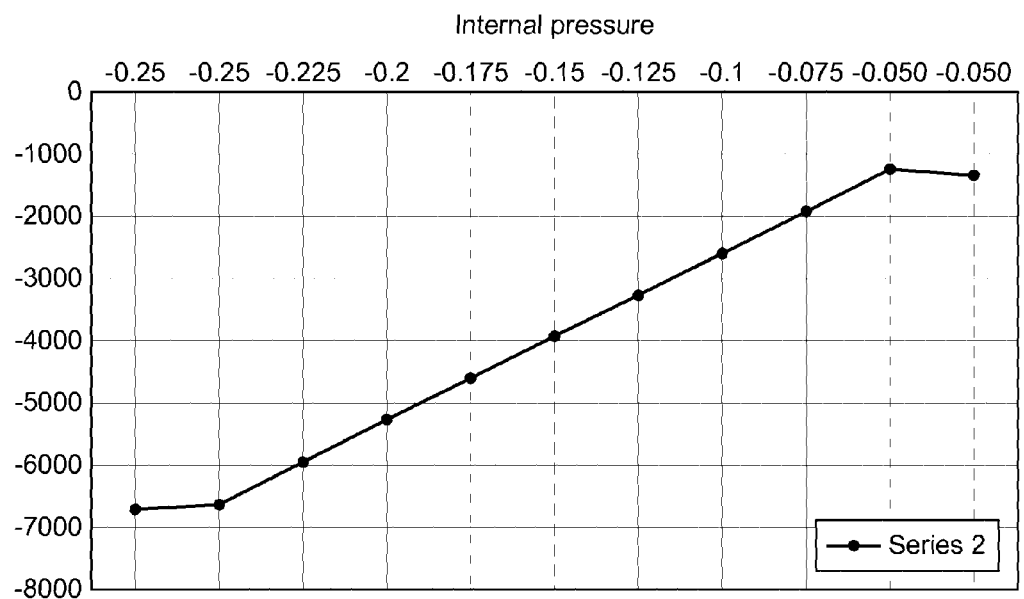
Figures 10F, 10G:
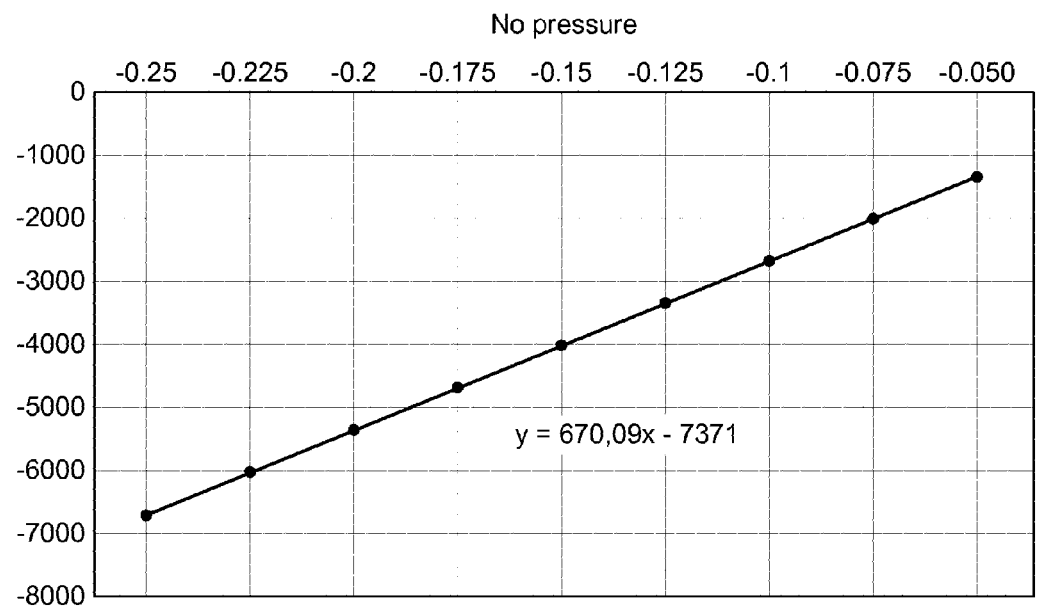
Figures 10H, 10I:
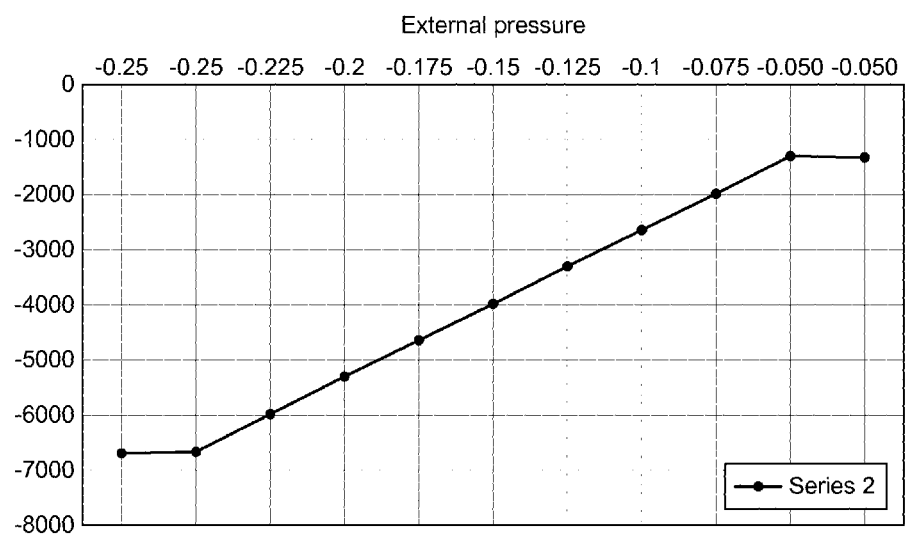
Figure 14:
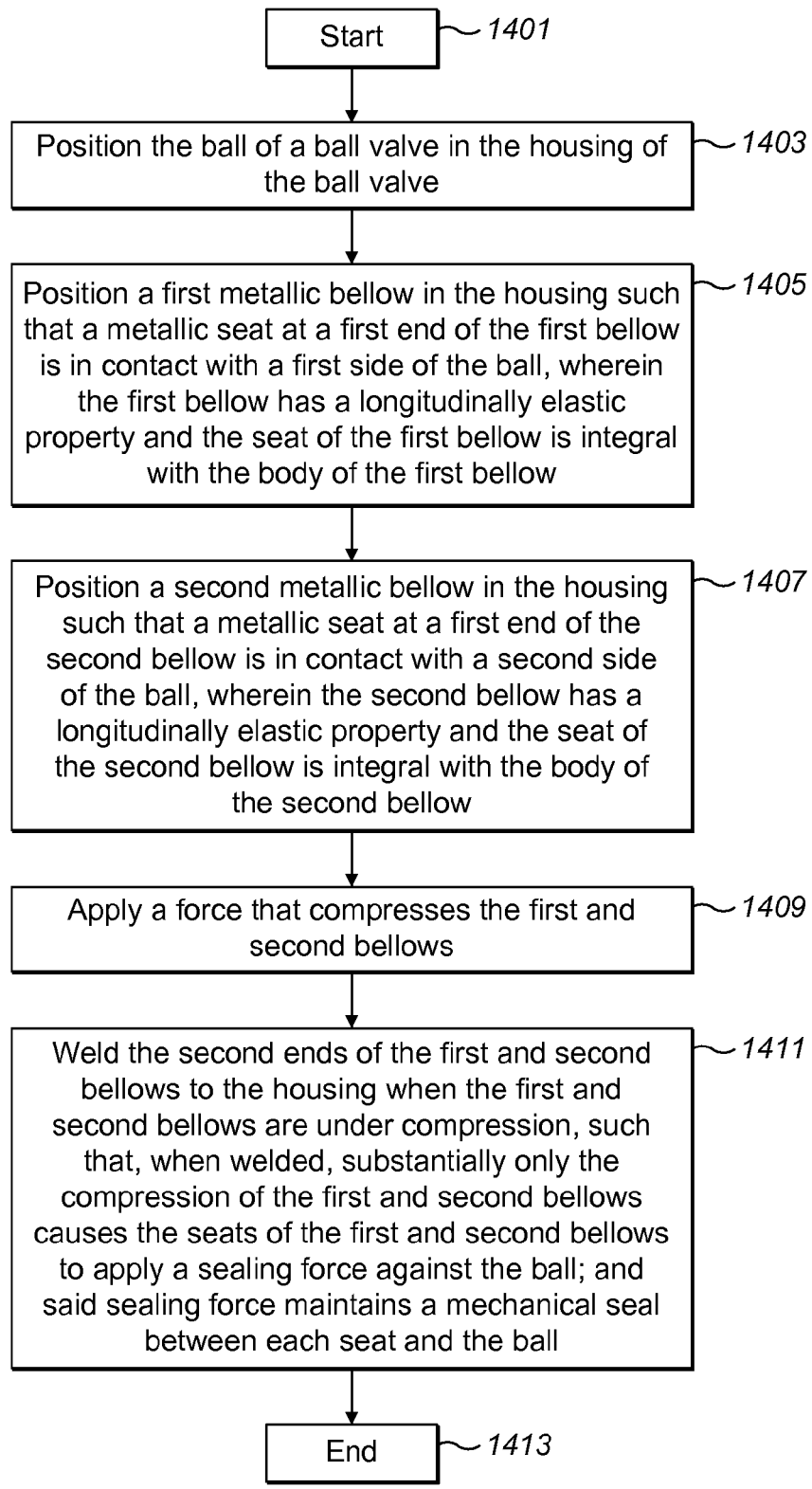
Figure 15:
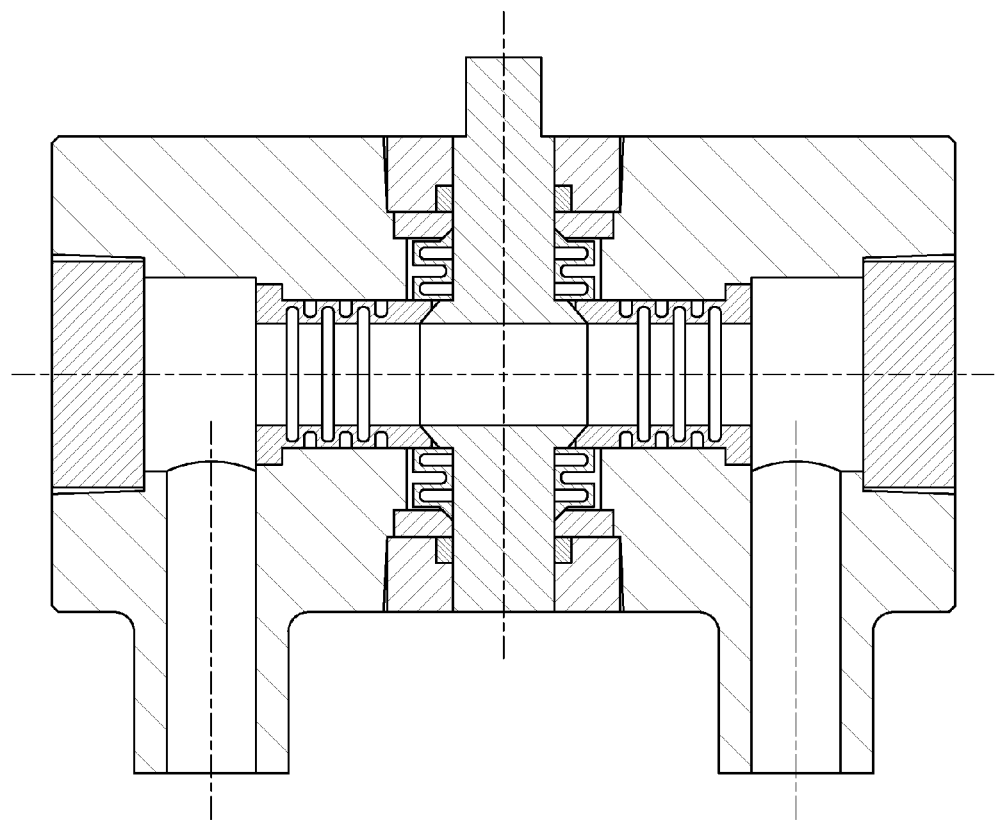

FIG. 4A provides properties of bellows according to embodiments of the invention;

FIG. 4B provides properties of bellows according to embodiments of the invention;

FIG. 5 shows a primary bellow according to an embodiment of the invention;

FIG. 6 shows a secondary bellow according to an embodiment of the invention;

FIG. 7 shows a ball and stem according to an embodiment of the invention;

FIG. 8 shows a housing according to an embodiment of the invention;

FIG. 9 shows a ball valve according to an embodiment of the invention;

FIGS. 10A to 10B provide an example of the invention;
FIGS. 11A to 11G provide an example of the invention;
FIGS. 12A to 12F provide an example of the invention;
FIGS. 13A to 13F provide an example of the invention;
FIG. 14 is a method according to an embodiment of the invention; and FIG. 15 shows a design of ball valve according to an embodiment of the invention.

DESCRIPTION OF EMBODIMENTS

Embodiments of the invention provide a new design of bellow for use in a ball valve, a new design of ball valve comprising such bellows, and a new method of manufacturing a ball valve for subsea applications. A metal-to-metal seal is provided between the seats and the ball of the ball valve in order to ensure high reliability of the seal over long time periods in subsea conditions. Each seat is manufactured integral to the body of a metal bellow within the housing. The metal bellows are pre-tensioned when the valve is constructed to ensure that a minimum positive pressure is applied by the seats against the ball so that a mechanical seal is maintained under all conditions. The compression of the bellows alone ensures that a mechanical seal is maintained and, unlike known designs of ball valve, the ball valve does not comprise any springs or polymeric material for this purpose. The metal bellows are welded to the housing. The integral construction of each seat to a bellow and the welding of the bellow to the housing ensures high reliability over long time periods.

In some embodiments, the ball valve has a Trunnion ball arrangement and therefore has a mechanical anchoring system for positioning the ball along an axis perpendicular to the axis of the bore through the ball. Embodiments comprise a new sealing system for the stem of the ball. The sealing system filters abrasive material in any fluids that leak through the seal and prevent any such fluids from damaging polymeric seals that prevent sea water from leaking into the housing.

Advantageously, the valve can be expected to maintain a high performance over a time period of 40 years or more when operating with abrasive fluids and at extremely high or low temperatures in subsea applications. The valve is easy to construct and requires little or no maintenance.

Figure 1:
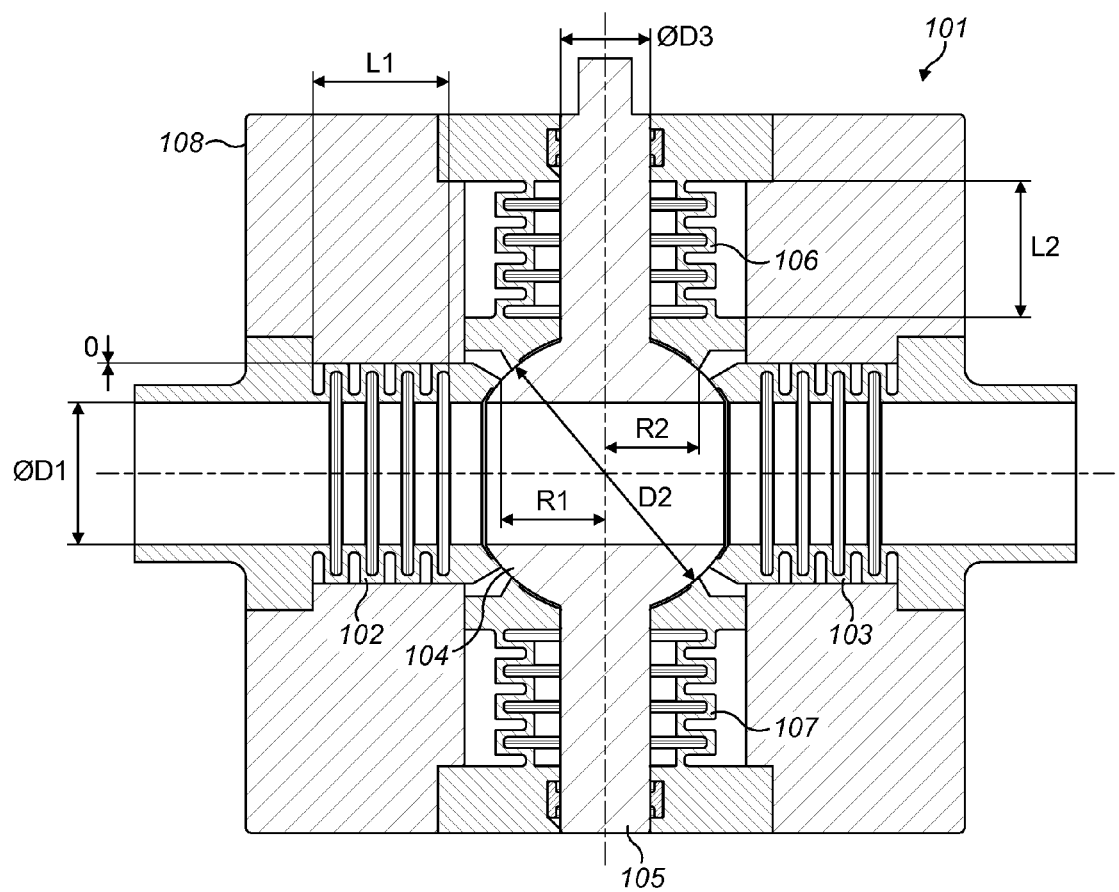
FIG. 1 shows a design of ball valve according to an embodiment of the invention.

FIG. 1 shows a cross-section through a ball valve 101 according to an embodiment of the invention.

The ball valve 101 comprises a substantially spherical ball 104 that is supported by a housing 108. The ball 104 is able to rotate within the housing 108. The housing 108 has inlet and outlet ports of a bore, or through hole, that is provided through the housing 108. The ball 104 is positioned within the path of the bore through the housing 108. The ball 104 has a straight cylindrical bore, or through hole, through it. When the valve is open, the bore through the ball 104 is positioned relative to the bore through the housing 108 such that a fluid is able to flow into the inlet port of the housing 108, through the bore of the ball 104 and out of the outlet port of the housing 108. To close the valve the ball 104 is rotated within the housing 108 such that there is no fluid communication between the bore of the ball 104 and the bore through the housing 108. A rotation of the ball 104 within the housing 108 of 90 degrees changes the valve between the fully open and fully closed states. A stem 105 is provided integral to the ball 104 that extends through the housing 108, perpendicular to the axis of the bore through the ball 104, so that the ball 104 can be rotated by a torque applied to an end of the stem 105. In the present embodiment, an end of the stem 105 protrudes from the housing 108 so that the torque may be applied by a device external to the ball valve 101. In subsea applications, the torque for opening and closing the valve would typically be applied by an ROV.

A first bellow 102 is provided between the inlet port of the ball valve 101 and a first seat that provides a contact area with the ball 104. A second bellow 103 is provided between the outlet port of the ball valve 101 and a second seat that provides a contact area with the ball 104. The first and second bellows, which are preferably identical to each other, are referred to herein as the primary bellows. The primary bellows have a substantially cylindrical shape with the bore in each primary bellow providing part of the main flow path of fluid through the ball valve 101.

The seats of the primary bellows are metallic, as are the bellows themselves. The seats are fully integrated into the bellows such that the seats and bellows are single structure. A single process may be performed to make both the seats and the bellows together. At the opposite end of each bellow is a plug for the attachment of the bellow to the housing 108. The bellow is welded, preferably Electron Beam (EB) welded, to the housing 108 at the plug.

Each of the primary bellows is, to an extent, compressible and elastic along their longitudinal axes. The primary bellows are welded to the housing 108 whilst under compression. The compression within each primary bellow causes the seats of each bellow to inherently apply a force against the ball 104. The force applied by the seat is sufficient to maintain a mechanical seal between the seat and the ball 104. The force applied by each bellow is referred to herein as a sealing force. The bellows are designed so that the sealing force is greater than the minimum necessary to achieve a mechanical seal between the seat and ball 104 in order to ensure that the mechanical seal is maintained under all operating conditions. For example, the sealing force may be 100 N larger than the minimum force required to maintain the mechanical seal. Advantageously, the compression within the bellows alone maintains the mechanical seal between the seat and the ball 104. Contrary to known designs of ball valve, no springs or other mechanical components are provided in the ball valve 101 that force each seat against the ball 104. Such additional mechanical components complicate the design and manufacture of a ball valve, are potential points of failure and increase the manufacturing costs.

The inner surface of each solid metal bellow is the only surface around the main flow path through the housing 108 that fluid in the main flow path of the ball valve 101 contacts other than the ball 104. Advantageously, there is no contact between the fluid in the main flow path and a polymeric seal. The presence of a polymeric seal in known ball valve designs with metal-to-metal seals between the seat and the ball 104 is a weakness as a polymeric seal is unable to withstand abrasive fluids, such as fluids comprising sand.

As viewed in FIG. 1, the horizontal position of the ball 104 within the ball valve 101 is determined by the primary bellows. The vertical position of the ball 104, i.e. the position of the ball 104 in the housing 108 along the axis of the stem 105 of the ball 104, is determined by third and fourth bellows, referred to herein as secondary bellows As can be seen in FIG. 1, a third bellow 106 is provided between the top of the ball 104 and the part of the housing 108 that the top end of the stem 105 exits from. At one end of the third bellow 106 is a seat that contacts the top of ball 104. A fourth bellow 107 is provided between the bottom of the ball 104 and the part of the housing 108 that the lower part of the stem 105 extends down to. At one end of the fourth bellow 107 is a seat that contacts the bottom of the ball 104. The third and fourth bellows, i.e. the secondary bellows, are preferably identical to each other.

The seats of the secondary bellows are metallic, as are the secondary bellows themselves. The seats are fully integrated into the secondary bellows such that the seats and bellows are single structure. A single process may be performed to make both the seats and the bellows together. At the opposite end of each of the secondary bellows is a plug for the attachment of the bellow to the housing 108. The bellow is welded, preferably EB welded, to the housing 108 at the plug.

Each of the secondary bellows is, to an extent, compressible and elastic along their longitudinal axes. The secondary bellows are welded to the housing 108 whilst under compression. The compression within each secondary bellow causes the seats of each bellow to inherently apply a force against the ball 104. The force applied by the seat is sufficient to maintain a mechanical seal between the seat and the ball 104. The force applied by each secondary bellow is referred to herein as a sealing force. Advantageously, the compression within the secondary bellows alone maintains the mechanical seal between the seat and the ball 104. Contrary to known designs of ball valve, no springs or other mechanical components are provided in the ball valve that force each seat against the ball 104. Such additional mechanical components complicate the design and manufacture of the ball valve, are potential points of failure and increase the manufacturing costs.

Each of the plugs of the secondary bellows comprises a hole with a bushing so that the rotatable stem 105 can extend through, or at least into, each plug. A polymeric seal is provided between the stem 105 and the hole of the plug. The polymeric seal ensures that there is no flow of fluid through the part of the housing 108 where the stem 105 exits, i.e. at the top of the housing 108 as shown in FIG. 1, or where the stem 105 is supported, i.e. at the bottom of the housing 108 as shown in FIG. 1. In a subsea application the housing 108 may be surrounded by sea water. A polymeric seal is suitable for use with such a fluid. There may be an abrasive fluid flowing through the main flow path. However, there is no direct contact between the fluid in the main flow path and the polymeric seals. Advantageously, even if some of the abrasive fluid does leak across both a mechanical seal of a primary bellow and a mechanical seal of a secondary bellow so that it reaches a polymeric seal, the mechanical seals will have acted as a mill on any sand or other abrasive components in the abrasive fluid and this reduces the abrasive extent of the fluid such that it is not detrimental to the polymeric seal.

A further advantage of the ball valve 101 design according to embodiments is that the ball valve 101 is pressure balanced. The ball valve 101 has horizontal symmetry and the primary bellows ensure that a sufficient sealing force is applied by each of the seats in the main flow path. The ball valve 101 also has vertical symmetry and the secondary bellows ensure that a sufficient sealing force is applied by each of the seats of the secondary bellows.

Advantageously, the ball valve 101 design according to embodiments provides a ball valve 101 that is suitable for long term use with abrasive fluids in a subsea environment.

Specific details of embodiments of the designs and properties of the above described components of the ball valve 101 are explained in more detail bellow.

The seats provide the contact surfaces with the ball. The shape and surface of each seat are important for a good mechanical seal to be formed.

The surface of the seats are provided with a hard coating in order for the seal to be maintained in extreme operating conditions and to improve corrosion and abrasion resistance. Coating the seats can also reduce the friction between the seat and the ball. A suitable coating that can be applied to the surface of a seat is tungsten carbide (HVOF). For high temperature use and greater hardness, other carbides such as chrome carbide and cobalt-chromium alloys can be used to achieve hardness values of 70+ HRC and operating temperatures of up to 815° C.

The coated surfaces of each seat are prepared by applying a hard coating, such as tungsten carbide, and then machining, lapping and polishing the coating to create a good geometric fit between the seat and the ball and very fine surface microstructure.

A typical standard for seat coatings in the oil and gas industries is a tungsten carbide coating of a minimum thickness of 100 micron. The surface roughness of the finished surface prior to further treatment may be 0.5-1 micron Ra. Following further treatment by grinding/lapping/polishing, the surface roughness of the final surface may be 0.2-0.3 micron Ra or less and embodiments include applying techniques for reducing the surface roughness less than 0.2-0.3 micron Ra.

The properties of mechanical seals are very different to polymeric/elastomeric seals. When polymeric materials are used as a seal, the amount of creep leakage across the seal is dependent on the applied contact pressure. Increasing the contact pressure both compresses the peaks of the surface of the elastomer and the elastomer is also pressed into the grooves of the ball. A near perfect seal can therefore be formed provided a sufficiently high contact pressure is applied.

For mechanical seals, the hard coating on the seat and/or ball results in microstructural cavities in the interface being present. Even if there is a perfect geometrical fit between the curvatures of the surfaces of the seat and ball, the surfaces are practically non-elastic and so even if a high contact pressure is applied, the microstructural cavities remain and prevent a perfect seal from being formed. To a certain extent the geometrical fit between the surfaces of the seat and ball will not be perfect and there will be marginal shape and roundness deviations of the seat and ball. When the seat first contacts the ball, further increasing contact pressure will elastically press the parts into a better geometrical fit and thereby improve the mechanical seal. Accordingly, for mechanical seals, so long as a certain minimum contact force is applied between the seat and ball to ensure that they are properly mated, the leakage across the mechanical seal becomes practically independent of the contact force.

Figure 2:
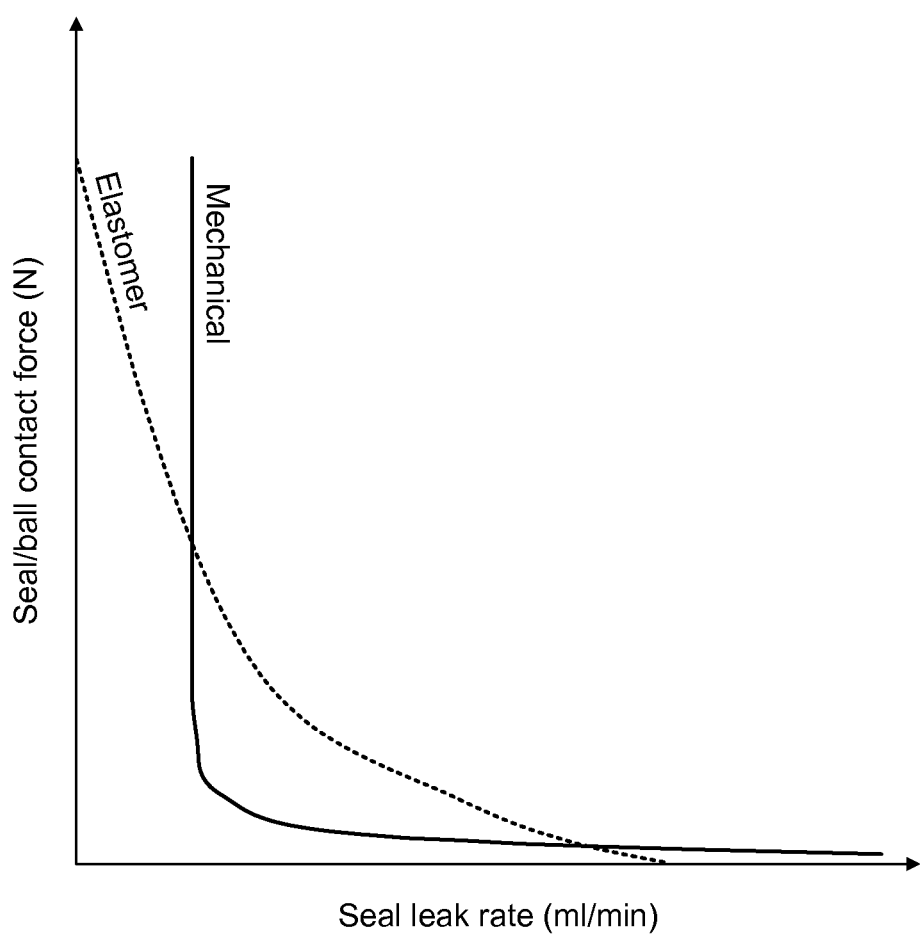
FIG. 2 shows the different properties of mechanical and polymeric seals.

The different properties of polymeric and mechanical seals are shown in FIG. 2. It is clear that a polymeric seal can provide a near perfect seal provided that a sufficient contact force is applied. With a mechanical seal, a perfect seal cannot be formed and a small amount of leakage is expected. Close to optimum sealing performance is achieved so long as a certain minimum contact force is applied.

The primary bellows are integrated with their seats so that each bellow and its seat is a solid metal unit. The bellows are, to a certain extent, longitudinally compressible and elastic. When the ball valve is constructed, the bellows are welded in position whilst under compression. This causes each of the primary bellows to inherently apply a force their seat against the ball of the ball valve and the applied force is a sealing force. The sealing force applied by each bellow should be at least the above-discussed minimum contact force for maintaining a mechanical seal between the seat and the ball. In addition, the sealing force applied by each bellow should preferably be larger than the minimum contact force for maintaining a mechanical seal between the seat and the ball so that the mechanical seal is maintained under all operating conditions.

The torque required to rotate the ball of the ball valve, to open and close the valve, is dependent on the sealing force applied by the primary bellows. As the sealing force increases, the friction between the ball and the seat increases and this increases the torque required to rotate the ball. For subsea applications, it is desirable for the torque required to rotate the ball of the valve to be no greater than the maximum torque that can be applied by an ROV. ROVs are specified by torque classes defined by an ISO. For example, class 1 is a torque of about 75 Nm and class 2 is a torque of about 193 Nm. A commercially available ROV for torque classes 1 to 4 can apply torques up to 2710 Nm.

Accordingly, the sealing force applied by the primary bellows should preferably remain within a specific range under all operating conditions such that the sealing force is always sufficient to maintain a mechanical seal but never so large that the torque required to open and close the valve is too large for ROV actuation Important to realising this performance is the bellow design and compression applied to the bellows when constructing the ball valve.

Further requirements of at least the primary bellows are that in operation they are able to withstand the maximum internal pressures within the ball valve, the same pressure from the outside (in the event of a sudden internal pressure loss), differential pressure across the ball of the ball valve, the fluid types (including fluids comprising sand and are therefore abrasive), the operating temperatures and any operating conditions.

Preferable materials for manufacturing the bellows from are from the Inconel® class of materials, in particular Inconel® 718. These are a known family of austenite nickel-chromium-based superalloys. For less critical applications than long term subsea use and larger valves, lower performance materials may be used so long as they fulfil the requirements for their application.

Preferably, very similar, or the same, materials are used for both the primary and secondary bellows, the ball and the housing. This ensures consistent thermal expansion within the ball valve and avoids changes in pretension and geometry that can disturb sealing and performance Additional advantages include it being easier to weld each bellow to the housing when the bellow and the housing are the same material and galvanic erosion being reduced.

All bellows according to embodiments are preferably manufactured from the materials as described above. With regard to ensuring an appropriate sealing force is applied by the seat of the bellow against the ball, this is determined by the specific structure of the bellow and the compression in the bellow when the bellow is welded to the housing. The specific structure of each bellow can be realised in a number of ways with the requirements of an appropriate sealing force being applied maintained.

Figure 3A:
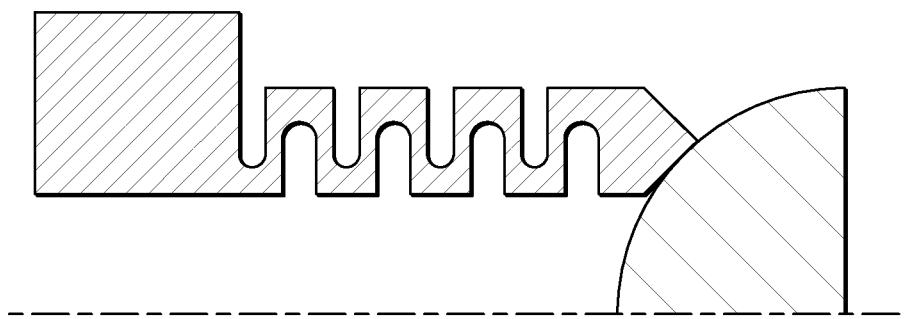
FIGS. 3A to 3C show different designs of bellow according to embodiments of the invention.
Figure 3B:
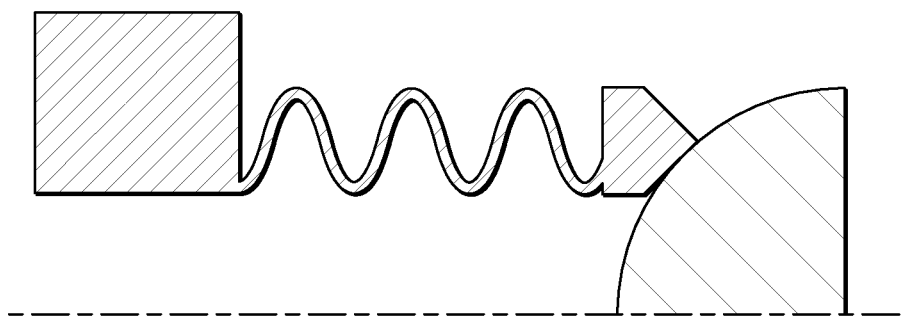
Figure 3C:
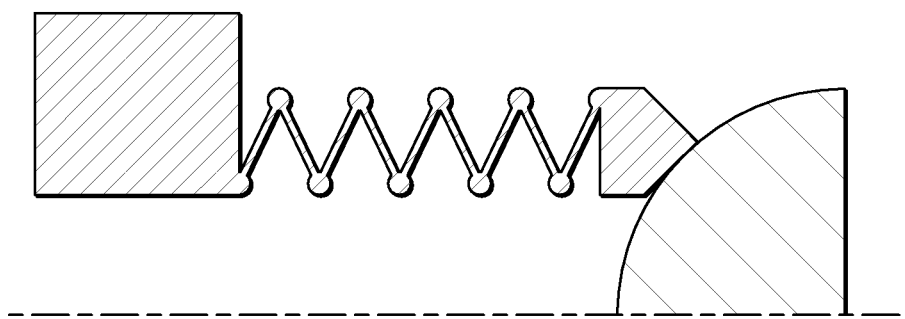

FIGS. 3A to 3C show some of a number of possible structures of bellow that may be used to implement a bellow according to an embodiment.

The bellow in FIG. 3A has rectangular grooves machined from a cylindrical or cuboid piece. The elastic properties of the bellow are dependent on the diameters of the vertical and horizontal sections of the rectangular grooves and these may be varied so that the bellow has its required elastic properties.

The bellow in FIG. 3B has its elastic properties provided by a sinus of half circle shaped convolutes. The metal thickness, number and wavelength of the sinus can be varied to ensure that the bellow has the desired elastic properties. An advantage of the bellow having such a wavelike shape, is that the pressure from the flowing media influences the bellow stress and helps to ensure that an even positive surface pressure is maintained between the seat and ball.

The bellow design shown in FIG. 3C can be constructed from a plurality of ring, triangular or planar sections that are welded together. The welding may be laser welding. This design of bellow is more appropriate for larger diameter valves in low cost applications. The bellows may not be as strong as bellows that have been machined from a single metal block but are strong enough for their application and easier to construct.

For a particular size of ball valve, the bellow needs to apply a certain minimum sealing force against the seat to ensure that a mechanical seal is maintained under all operating conditions. For a particular ball valve design, a number of different designs of bellow will meet these requirements. The sealing force applied by any particular bellow design is determined by the spring constant (also referred to as spring coefficient or spring stiffness) of the bellow and the reduction in length of the bellow caused by the bellow being compressed.

More particularly, bellow designs have the following main properties:

1. After being compressed during manufacturing so that the desired sealing force, F, is applied, the bellow provides a desired seat surface load, $\sigma_N$, for any pressure level the valve is designed to be operated under. That is to say, the bellow/seat geometry ensures that $\sigma_N$ remains within desired range from an unpressurised state to a fully pressurised state. The lowest value of $\sigma_N$ should maintain the mechanical seal between the seat and ball and, preferably, the maximum value of $\sigma_N$ is such that the ball valve can be easily opened and closed.

2. The spring stiffness of the bellow, K, is selected so that F is achieved with a compression length, $\Delta L$, that is suitable for the actual ball valve size taking account of manufacturing tolerances and differential thermal expansion of bellow parts.

3. The bellow must be designed mechanically to withstand from the inside the maximum pressure of the valve for intended design cycle life, $N_{LC}$ 4. The bellows must be designed mechanically to withstand other load cases that may occur, in particular the external pressure load in case of a sudden loss of internal pressure.

The seat surface load, $\sigma_N$, relates to F according to following approximate formula:

$$\sigma_N = \frac{F}{2\pi r_b \sin\theta a_s \cos\theta}$$

where $r_b$ is the radius of the ball of the ball valve, $a_s$ is width of seat/ball contact surface, and $\theta$ is the angular position of the contact surface centre line on the ball relative to valve axial centre line.

$\sigma_N$ must be sufficient to secure that a mechanical seal is maintained between the seat and ball and to avoid face separation by the intrusion of particles.

For near perfectly shaped identically lapped mechanical seal surfaces, a surface finish of 1 helium light bands, 280 nm, or less will ensure a practically leak tight mechanical seal. Tungsten carbide can be lapped to 10 nm if necessary and embodiments include lapping the tungsten carbide coating to 10 nm.

In some valve applications, $\sigma_N$ may be as low as 0.2 N/mm². For other applications, such as non-lubricated mechanical seals, $\sigma_N$ of up to 25 N/mm² may be used. In a ball valve application with a one quarter slow turn valve operation, the practical maximum value for $\sigma_N$ is the ultimate compressive strength of the coating and base metal which is typically 300-400 N/mm². Preferably, $\sigma_N$ is considerably less that the above maximum value so that mechanical sealing is maintained but the opening/closing torque of the ball valve is not so high that it makes operating the ball valve difficult.

The torque required to open and close the ball valve, i.e. rotate the ball of the ball valve, resulting from $\sigma_N$ in the two primary bellows for a non-pressurized valve is:

$$T_0 = 2\mu F r_b \cos\theta = 4\mu\pi\sigma_N r_b^2 a_s \sin\theta \cos^2\theta$$

where $\mu$ is the friction coefficient between the ball and seat. For a dry static tungsten carbide vs tungsten carbide seal, $\mu$ would typically be in the range 0.2 to 0.25.

In addition to $T_0$ there will also be a certain torque resulting from the secondary bellows and seals for the stem. With same bellow compression force F and $\sigma_N$, the torque arm will be smaller depending on ball and seat geometry. To account for any friction in the bushings and secondary elastomeric seals for the stem, the full torque for a non-pressurized valve can be estimated as:

$$T_{NP} = 2T_0$$

Full pressure P on one side of ball will create following torque from friction in stem bushings:

$$T_1 = \mu P \pi r_b^2 \sin^2\theta r_s$$

where $r_s$ is the radius of stem bushing contact surface.

The maximum opening/closing torque at full differential pressure can therefore be estimated as:

$$T_{FP} = 2T_0 + T_1$$

With regard to the designed reduction in length of the bellow when it is compressed when the ball valve is formed, $\Delta L$, the ball valve design preferably does not require extreme tolerances and temperature control during the manufacturing of parts. Accordingly, the spring stiffness of the bellow, K, should be flexible enough to allow standard straightforward CNC machining, lapping, assembly, adjustment and EB welding without temperature control. The value of K should also be low enough for normal manufacturing tolerances to be acceptable and maintain the sealing force F within the intended range for actual valve. Typical expected tolerances for CMC machined parts will be in the order of ±0.01 mm for parts less than 1", i.e. 25.4 mm, size and ±0.1 mm for large parts of 1 m size. For such large parts, differential temperature needs to be considered as ±10° C. corresponds to ±0.17 mm for normal stainless steel. Therefore the design should allow for tolerances in the range ±0.2 mm. For each bellow, $\Delta L$ is preferably at least 5 to 10 times the expected tolerance so that the manufacturing tolerances are low relative to the applied compression to a bellow.

The manufacture and construction of the components of a ball valve according to embodiments is to a sufficient precision for the following manufacturing tolerances of components and construction tolerances to be acceptable:

Ball diameter: D2=±0.01 mm

Bellow length: L1, L2=±0.075 mm

Bellow mounting plane to housing centre lines: L3, L4=±0.01 mm

FIG. 4A provides a summary of properties that primary bellows may have according to embodiments. FIG. 4B provides a summary of properties that primary bellows may have according to embodiments.

With regard to the secondary bellows, their specific design is less critical than that of the primary bellows. The primary bellows need to be designed to withstand the effect of direct flow of well fluids through their bores. There is no such direct flow of well fluids through the secondary bellows and the extremes of the conditions that the bellows are required to operate under are therefore less. In addition, as can be seen in FIG. 1, the seats of the secondary bellows are closer to the stem of the ball valve than those of the primary bellows. The torque created by the seats of the secondary bellows is therefore less than those of the primary bellows.

The secondary bellows are preferably made from the Inconel® class of materials, in particular Inconel® 718, as described above. The structure and properties of the secondary bellows can be very similar to, or substantially the same as, the primary bellows as described throughout the present document.

The seats of the secondary bellows are metal and coated with tungsten carbide and finished to form a good geometric fit with the ball as described above. The other end of each secondary bellow to the end with the seat has a plug, that is welded to the housing, and a bushing so that the stem of the ball can pass through the plug and rotate. A polymeric seal is provided in an annular groove of each plug. The welding of the plug to the housing is preferably by EB welding. An advantage of EB welding is that the heatflux is low and the polymer seals in the plugs are not damaged by the welding process.

The polymeric seal ensures that there is no flow of fluid through the part of the housing where the stem exits, i.e. at the top of the housing as shown in FIG. 1, or where the stem is supported, i.e. at the bottom of the housing as shown in FIG. 1. In a subsea application the housing may be surrounded by sea water. A polymeric seal is suitable for use with such a fluid and will prevent sea water from flowing into the valve and any fluids leaking out of the valve. There may be an abrasive fluid flowing through the main flow path. However, there is no direct contact between the fluid in the main flow path and the polymeric seals. The ball valve is advantageously designed so that the flow of fluid from the main flow path to the inside of the secondary bellows is small and, moreover, any fluid from the main flow path that does reach the inside of a secondary bellow is not abrasive and damaging on the polymeric seal in the plug of the secondary bellow. Fluid from the main flow path can only reach the inside of the secondary bellow by both leaking across the mechanical seal between a seat of the primary bellow and the ball and also leaking across the mechanical seal between a seat of the secondary bellow and the ball. Each of these mechanical seals acts as a mill on any sand or other abrasive components in the fluid from the main flow path and this reduces the abrasive extent of the fluid such that it is not detrimental to the polymeric seal.

As can be seen in FIG. 1, the end of each bellow with the seat preferably comprises a solid annular portion that extends across to the walls of the housing. When the ball valve is in use, a large differential pressure can be generated across the ball of the ball valve when the ball valve is closed and blocking the flow of a high pressure fluid. Advantageously, the annular extension receives some of the force that is being applied against the ball by the high pressure fluid. This has the effect of reducing the increase in contact pressure, between the seat of a primary bellow and a ball, caused by the high pressure fluid.

The ball and stem of the ball valve is preferably manufactured form the Inconel® class of materials, in particular Inconel® 718, as described above. The ball is preferably coated with tungsten carbide, and then machined, lapped and polished to the same standard as the seats to create a good geometric fit between each seat and the ball and very fine surface microstructure.

The housing of the ball valve is also preferably manufactured form the Inconel® class of materials, in particular Inconel® 718, as described above.

FIG. 5 shows an exemplary design of primary bellow according to an embodiment. As shown in FIG. 5, the seat is on the left and the seat, the bellow and the plug are a single solid metal unit.

FIG. 6 shows an exemplary design of secondary bellow according to an embodiment. As shown in FIG. 6, the seat is on the left and has an annular extension to help absorb any differential pressure on the ball of the ball valve. The seat the bellow and the plug are a single solid metal unit.

FIG. 7 shows an exemplary design of ball and stem. The shape and structure of the ball and stem may be as known in the art for the ball and stem of a ball valve. Preferably, the ball and stem are manufactured as a single solid metal unit.

FIG. 8 shows an exemplary design of a housing according to an embodiment. The housing preferably has a cuboidal design as this is performs particularly well under high pressure conditions. The housing is preferably a single solid metal unit.

FIG. 9 shows an exemplary design of a constructed ball valve from primary bellows, secondary bellows, a ball and stem and housing according to embodiments. The vertical and horizontal symmetry of the ball valve is clearly shown and helps to reduce the effects of high pressure conditions on the operation of the ball valve.

Specific structures of ball valve designs, in particular bellow designs, and FEM simulated results of their performance are discussed in the below Examples 1 to 4 of embodiments of the invention with reference to FIGS. 10 to 13.

The preferred dimensions of the components of a ball valve and their properties are made with reference to the labelling of dimensions as provided in FIG. 1.

EXAMPLE 1

D1 = 25.4 mm
D2 = 50 mm
D3 = 16 mm
R1 = 19.2 mm
R2 = 16 mm
L1 = 24.4 mm
L2 = 24.4 mm

The primary bellows, referred to as bellows 1 and 2, are made from Inconel® 718. The design of the primary bellows is shown in FIG. 10. The properties of Inconel® 718 are provided in FIGS. 10B and 10C.

| | | |
|---|---|---|
| K1 = 26804 N/mm | spring stiffness bellow 1. | |
| K2 = 26804 N/mm | spring stiffness bellow 2. | |
| ΔL1 = 0.175 mm | pre-tension bellow 1. | F1 = K1 * ΔL1 = 4690.7 N |
| ΔL2 = 0.175 mm | pre-tension bellow 2. | F2 = K2 * ΔL2 = 4690.7 N |
| μ = 0.25 | dry static friction coefficient of TC/TC | |

Relaxation in bellow when fully pressurised (from FEM analysis)

$$Fp = 94 \text{ N}$$

Force acting on ball at full differential pressurise:

$$P = 69 \text{ N/mm}^2$$
$$FB = \pi * (D2 * D2/4 - R1 * R1) * P = 55571 \text{ N}$$

Torque to open/close valve due to friction from pretension:

$$T0 = 2 * \mu * F1 * R1 \quad 45.0 \text{ Nm} +$$
$$2 * \mu * F2 * R2 \quad 37.5 \text{ Nm}$$
$$= 82.6 \quad \text{Nm}$$

Torque to open/close valve at full differential pressure:

$$T0 = \mu * (F1 - Fp) * R1 \quad 22.1 \text{ Nm} +$$
$$\mu * F2 * R2 \quad 22.5 \text{ Nm} +$$
$$2 * \mu * F2 * R2 \quad 37.5 \text{ Nm} +$$
$$\mu * FB * D3/2 \quad 111.1 \text{ Nm}$$
$$= 193.2 \quad \text{Nm}$$

The simulated performance and properties of the primary bellows is shown in FIGS. 10D to 10I.

An appropriate sealing force for a ball valve with a 1 inch ball is about 1000 N or greater. This is sufficient to prevent intrusion of particles and to mill down any particles. A force of at least 1000 N should therefore be applied taking into account the worst case production and assembly tolerances which can be assumed to be $\delta L=\pm 0.075$ mm. A sealing force of 1000 N must also be secured when bellow is fully pressurized either from inside or outside.

The bellow designs of embodiments fulfil this requirement as demonstrated herein by FEM analysis:

When compressed to $\Delta L=0.125$ mm bellow force is 3350 N.

When compressed to minimum within expected bellow tolerance:

$\Delta L-\delta L=0.05$ mm; and the force is 1340N.

When maximum internal pressure, 69 MPa is superimposed, force is reduced to 1246 N When maximum pressure is superimposed on the outside of the bellow, force is reduced to 1316N The response on the seat contact force to internal and external pressure on the bellow is therefore very low: This is achieved by the balanced design of the bellow and the location of the centre line of the contact surface between seat and ball.

For the maximum tolerance, $\Delta L+\delta L=0.175$ mm the force is still not very high, 6701 N (spring coefficient 27804 N/mm)

With regard to the operational torque of the valve, with nominal tolerance of the bellows and a pre-tension of 0.125 mm, the open/close torque for the unpressurised valve is calculated to be 59 Nm. For a fully pressurized valve, the torque is 170 Nm.

Accordingly, the FEM stress analysis demonstrates acceptable stress and torque levels at the extremes of scenarios.

EXAMPLE 2

Figure 11A:
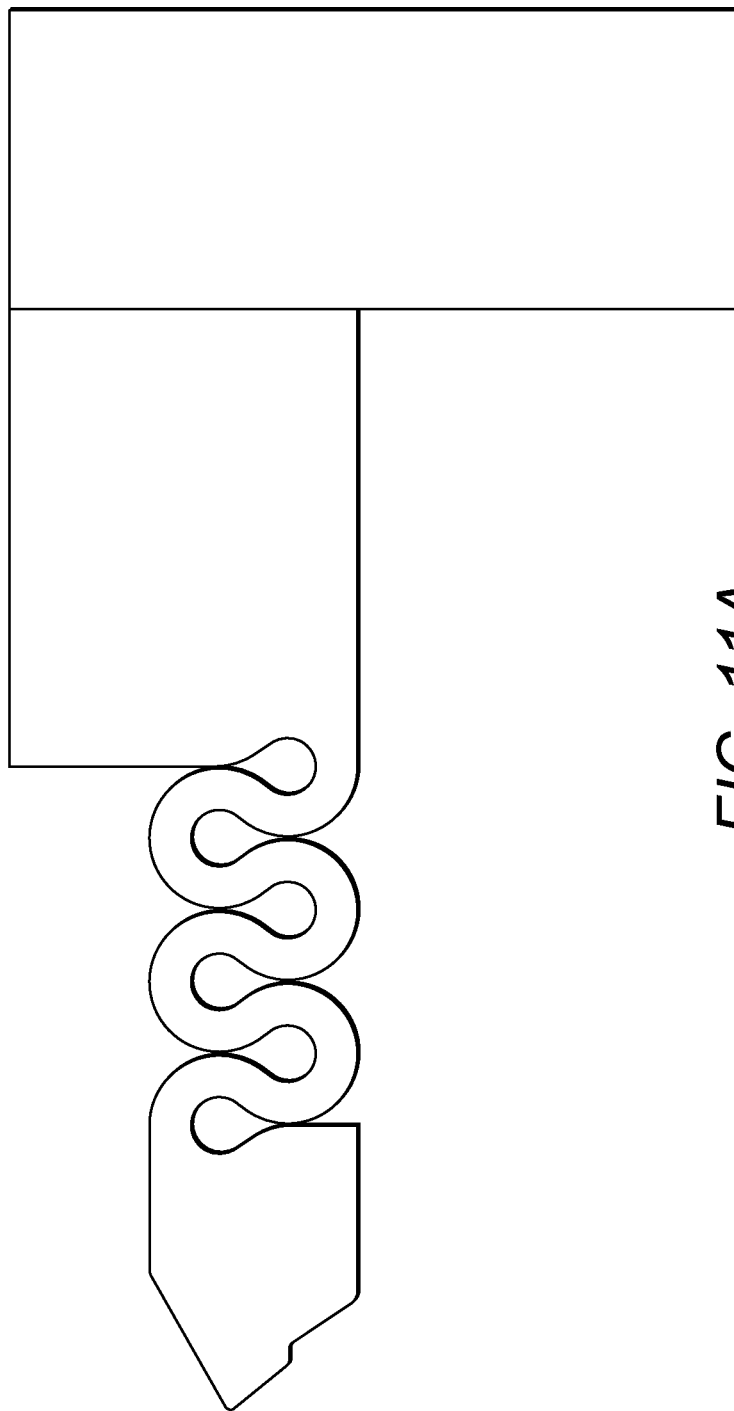
Figure 11B:
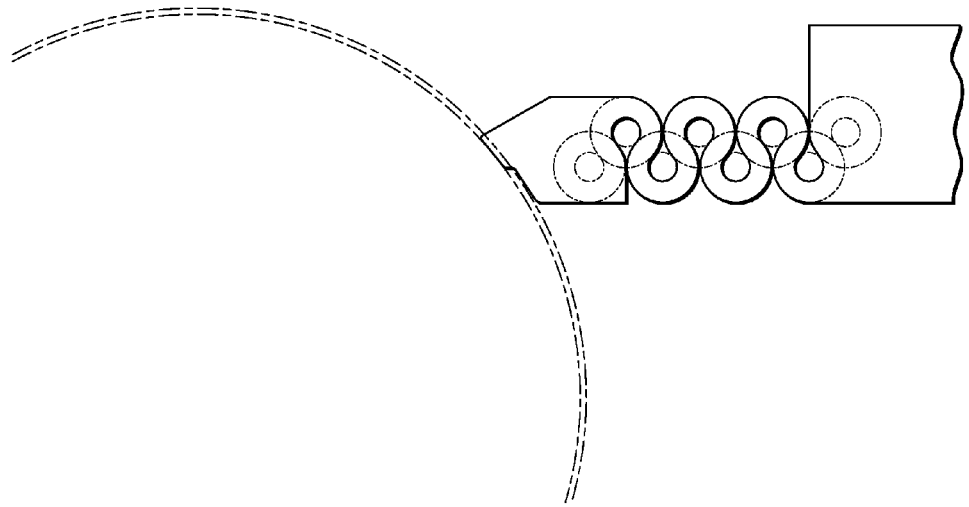
Figure 11C:
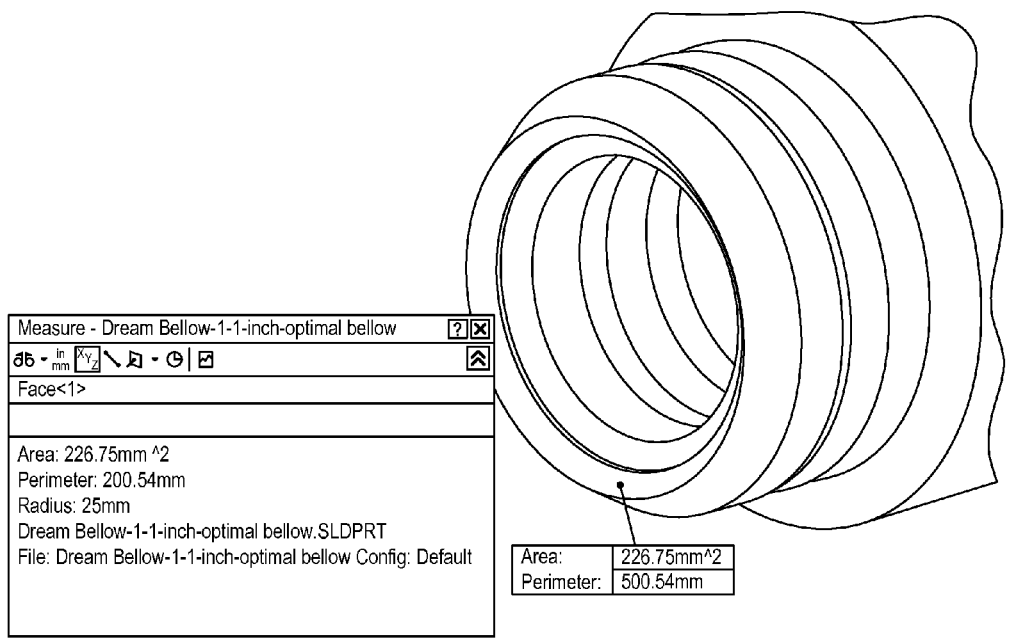
Figures 11D, 11E:
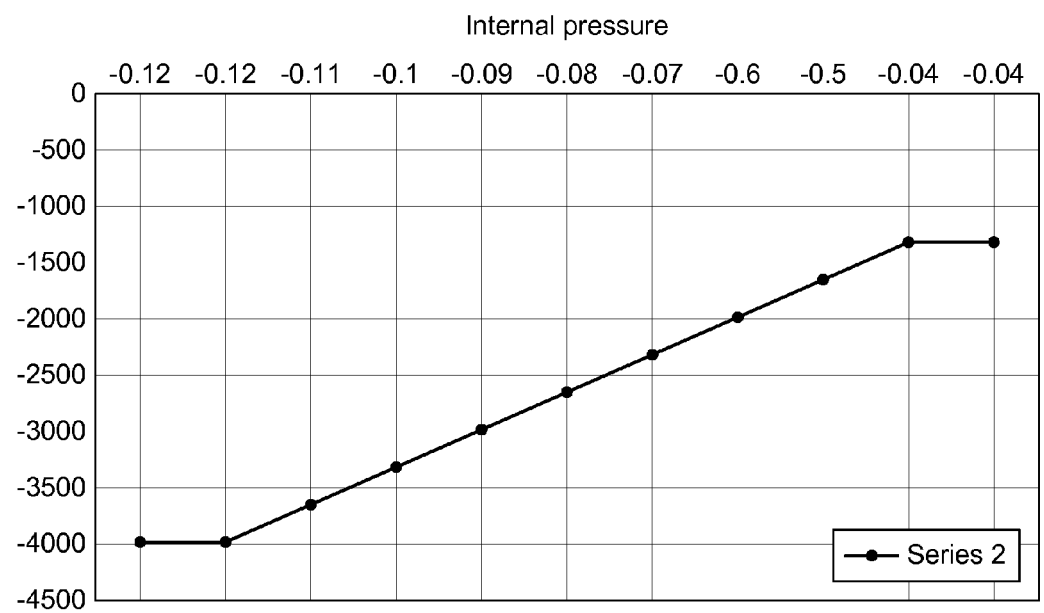
Figures 11F, 11G:
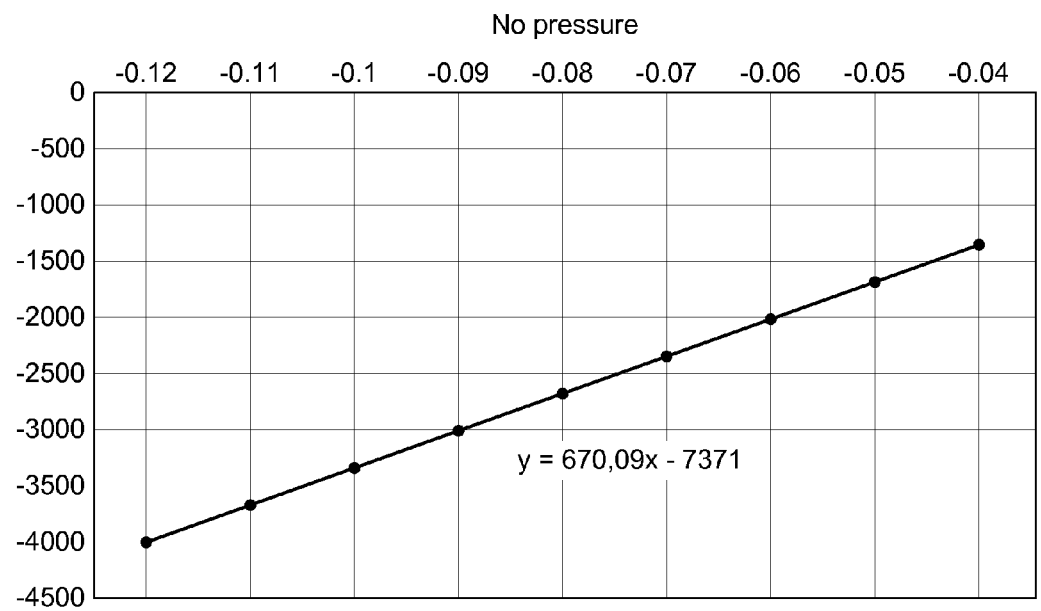

FIG. 11A is a cross-section through another design of primary bellow. This is the shape of bellow in the present example as well as that in Examples 3 and 4. This particular shape of bellow provides a high flexibility and with a low overall length of bellow as well as high resistance to internal pressure.

The bellows in the present example, as well as Examples 3 and 4, and all made of the same Inconel® 718 material as used in Example 1 and the properties of this are shown in FIGS. 10B an 10C.

FIGS. 10B and 10C provide the dimensions of the bellow, which is a 1 inch bellow.

FIGS. 10D to 10G show the simulated performance by FEM.

EXAMPLE 3

Figure 12A:
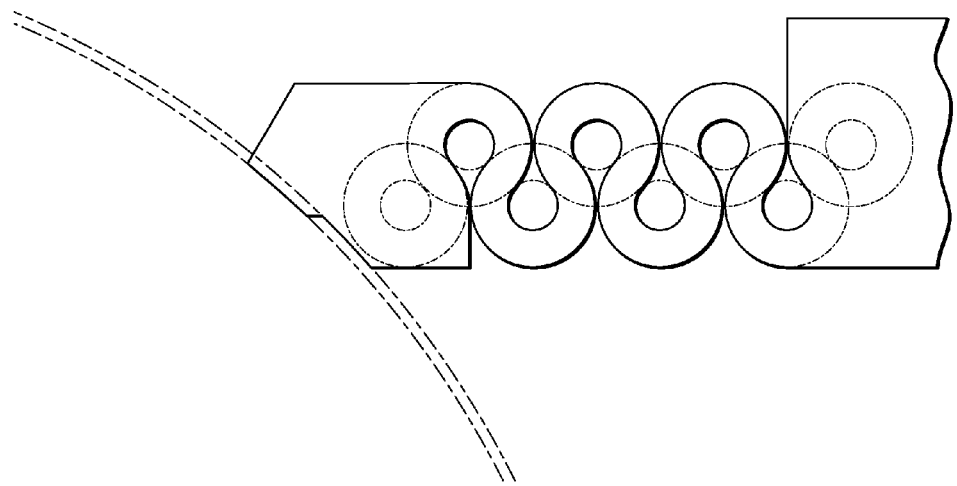
Figure 12B:
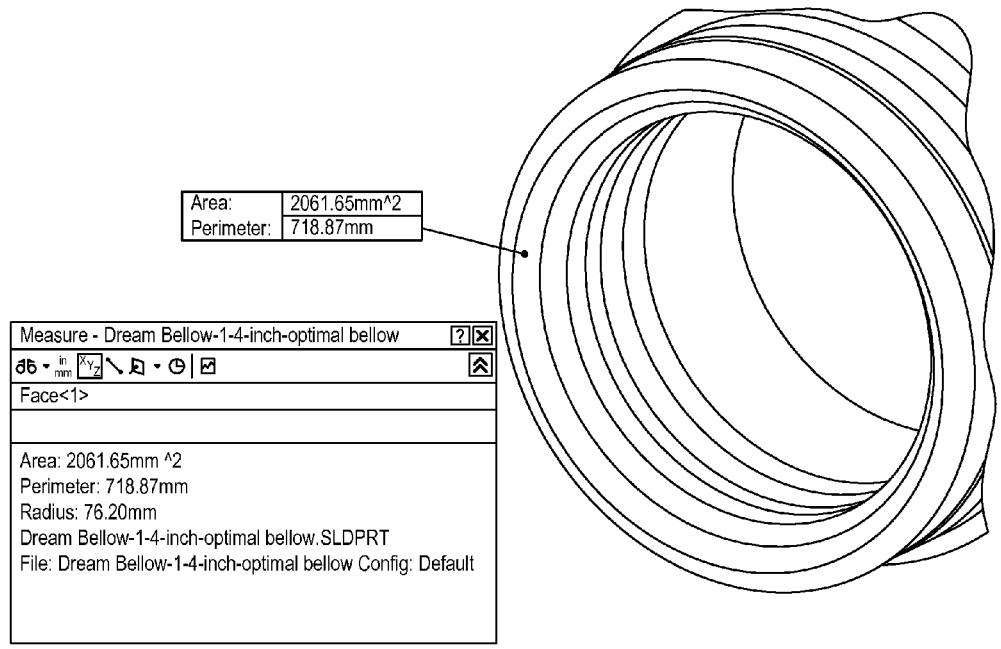
Figures 12C, 12D:
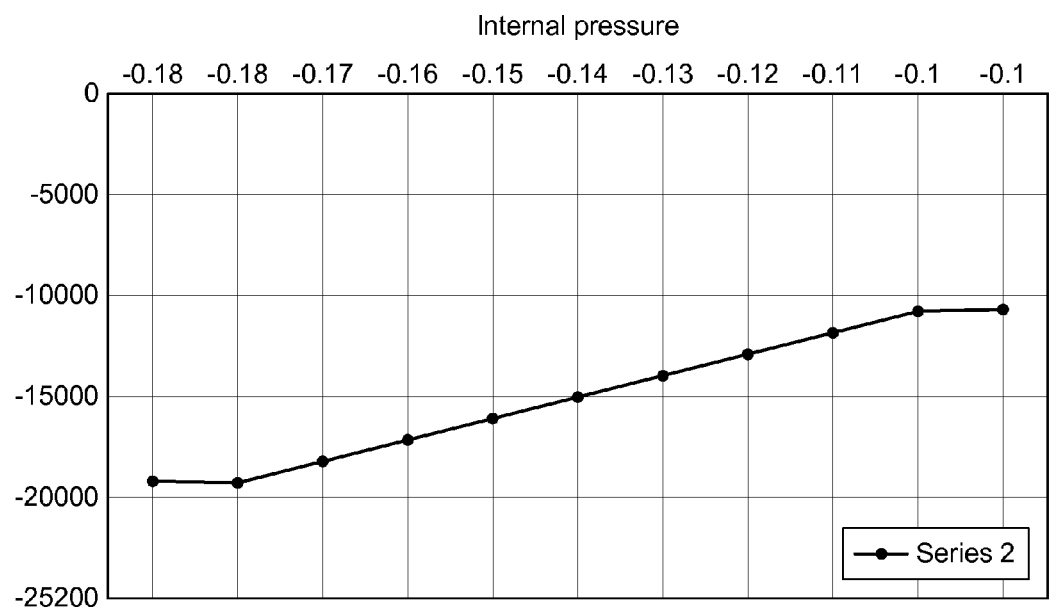
Figures 12E, 12F:
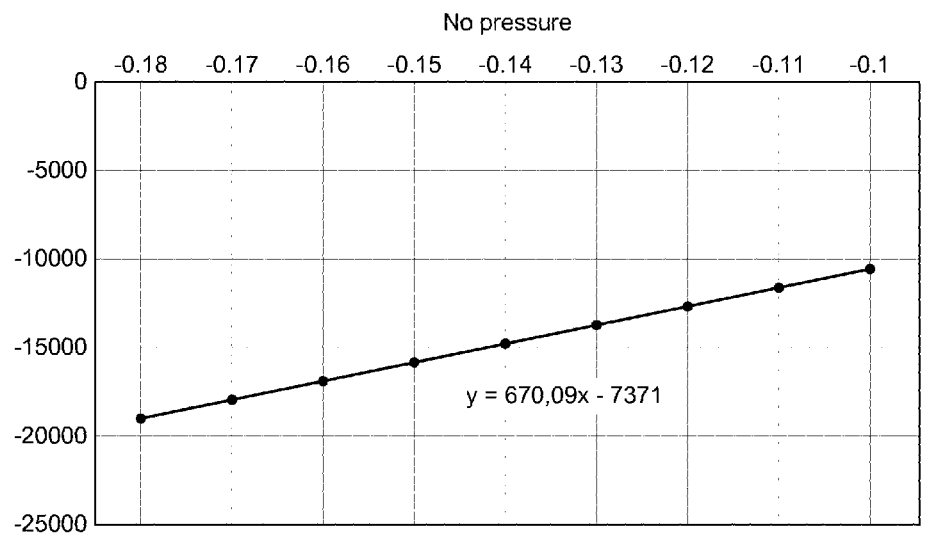

FIGS. 12A and 12B provide the dimensions of the bellow, which is a 4 inch bellow.

FIGS. 12C to 12F show the simulated performance by FEM.

EXAMPLE 4

Figure 13A:
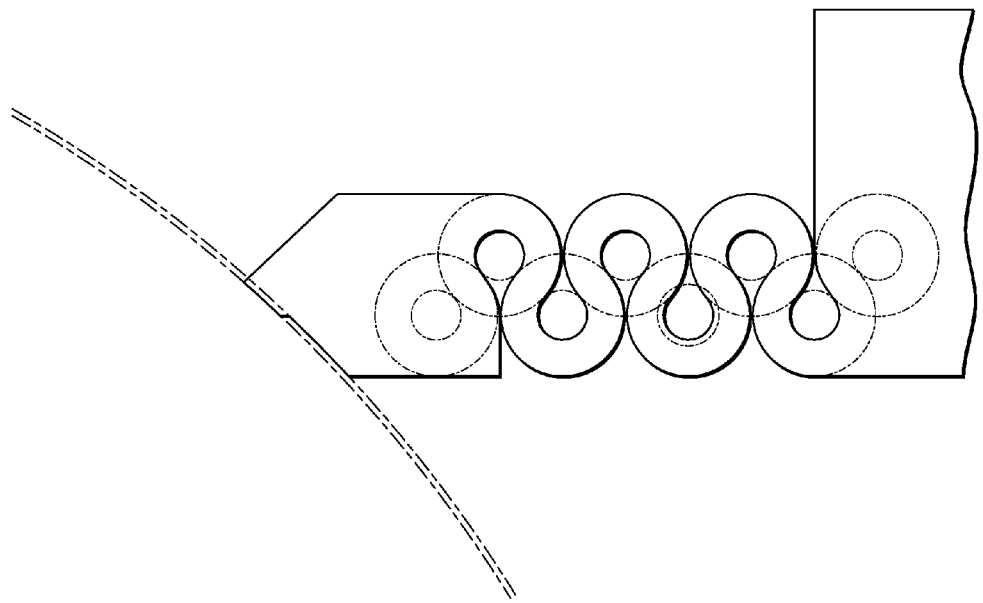
Figure 13B:
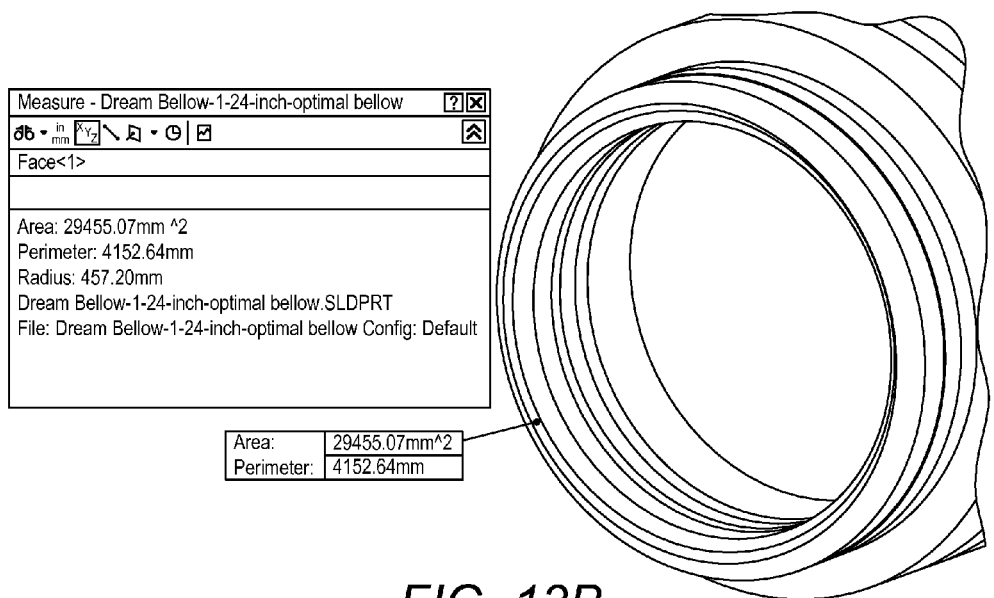
Figures 13C, 13D:
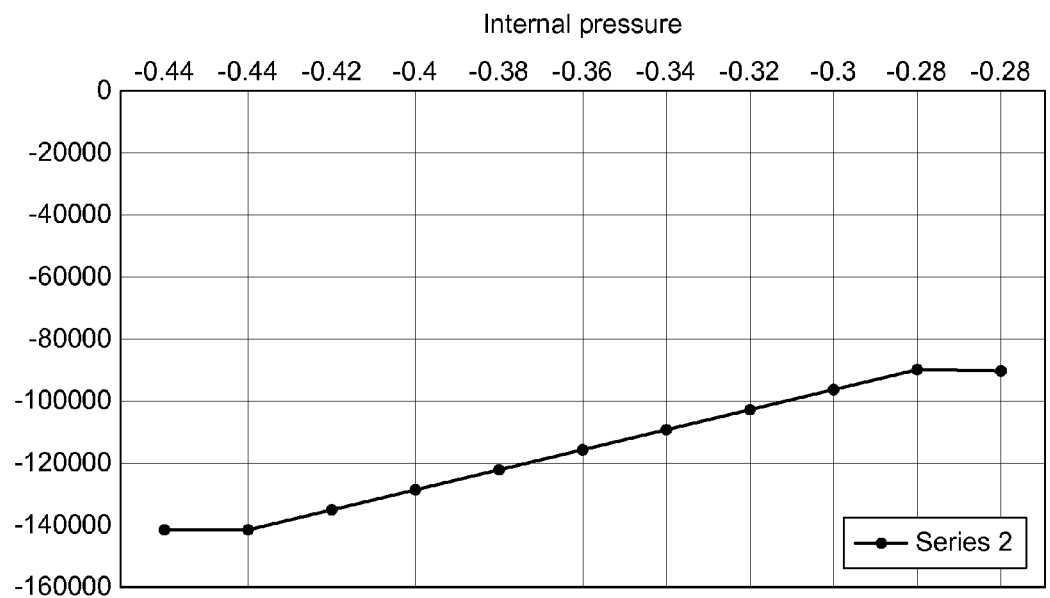
Figures 13E, 13F:
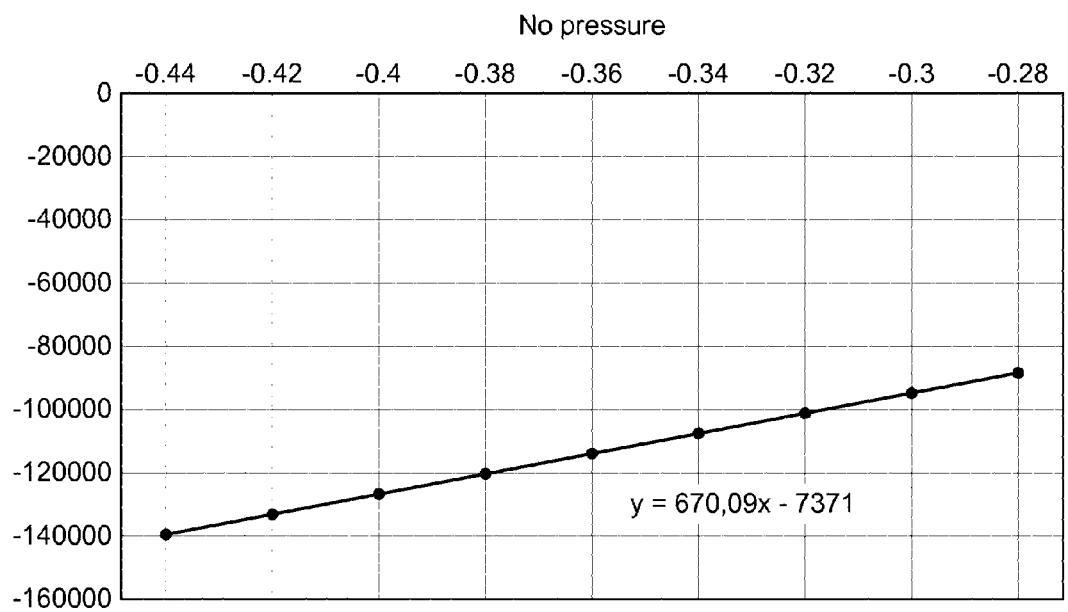

FIGS. 13A and 13B provide the dimensions of the bellow, which is a 24 inch bellow.

FIGS. 13C to 13F show the simulated performance by FEM.

The above results in Examples 2 to 4 show that:

Elastic behavior achieved when the bellow is pre-compressed. The spring coefficient is the gradient of the line.

The sealing force remains substantially constant when the internal pressure increases from zero to the pressure of a fully pressurized valve.

The resulting stress and strain for the Inconel® 718 material that the bellow is made from when the bellow experiences maximum compression and pressure (Inconel 718 has a yield limit of about 1365 MPa at an operating temperature of 200 degrees Celsius)

Embodiments also include a method of manufacturing a ball valve.

The main components of the ball valve are:

primary bellows with seats;

secondary bellows with seats, a ball and stem (which are preferably manufactured together as a single solid unit); and a housing These components of the ball valve are preferably as described in any of the embodiments throughout the present document.

An embodiment comprises constructing a ball valve according to the following steps:

a) The ball and stem are positioned in the housing.

b) Both of the secondary bellows are then inserted into the housing. Each of the secondary bellows has a polymeric seal positioned in its plug prior to being inserted into the housing. At least one end of the stem extends through the plug of a secondary bellow so that a contact point for rotating the ball and stem is provided external to the housing.

c) A first force is then applied to an end of each of the secondary bellows so that the seats of each of the secondary bellows are pressed against the ball. With the first force applied, the position of the secondary bellows is then fixed. This may be performed by a clamping arrangement.

d) Both of the primary bellows are then inserted into the housing.

e) A second force is then applied to an end of each of the primary bellows so that the seats of each of the secondary bellows are pressed against the ball.

f) With the second force applied, the torque required to rotate the stem of the ball valve is measured. If the torque is within the desired range of values for the ball valve being manufactured, then the ends of the primary and secondary bellows are welded to the housing by four welding operations.

Advantageously, the above-described process for constructing a ball valve can be performed quickly and easily.

The first and second forces are predetermined for a particular design of ball valve and chosen so that appropriate sealing forces are applied given the above-described requirements of the sealing forces. A number of different apparatuses can be used to applying the first and second forces. For example, a rod with screw threads at one or both ends could be positioned along the bore of the bellows being compressed and a screw(s) used on the screw head(s) to apply a compressive force to the bellows.

A number of modifications and variations can be made to the above-described method. These include one or more of:

i) If in step f) the torque is not within the required range of values for the ball valve being manufactured, the first and/or second forces are changed until the torque is within the required range and the primary and secondary bellows are welded in position with the changed first and/or second forces applied.

ii) Measuring the torque required to rotate the stem after applying the first force in step c) and before performing step d). If the torque is within a required range of values for the ball valve being manufactured, either clamping or welding the secondary bellows in position. If the torque is not within the required range, the first force is changed until the torque is within the required range and the secondary bellows clamped or welded in position with the changed torque applied. Advantageously, the first force can be independently adjusted because the second force is not being applied.

iii) The primary bellows may alternatively be positioned in the housing before the secondary bellows are positioned in the housing. This can be performed with a similar technique to that in ii) above so that the first force is independently adjusted without the second force being applied.

iv) If for a particular ball valve the maximum torque required to rotate the stem is not critical, the primary and secondary bellows can be welded in position without the torque required to rotate the stem of the ball valve being measured. The applied first and/or second forces may be slightly larger than necessary to ensure that mechanical seals are achieved.

The applied first and second forces will depend on the required sealing forces as well as how each of the plugs is arranged to fit into the housing. The required sealing forces are discussed above and will depend on the properties of the ball valve design as well as the properties of the specific components used to construct the ball valve.

The plugs of each bellow according to embodiments can be designed to fit into the housing in a number of different ways and the applied first and/or second forces are dependent on the technique used.

The plugs may have a tight press fit into the housing. An advantage of this approach is that the plug is securely fixed to the housing by its shape as well as the welding and this can aid the correct positioning of the bellow in the housing so that the axis of each bellow is aligned with the centre of the ball. A disadvantage of this approach is that the applied first and second forces are a combination of the force required to make the tight press fit as well as the force required to ensure a correct sealing force against the ball. From the applied force alone, it is therefore not possible to exactly determine the actual resulting sealing force. However, the components being used are manufactured to a high precision and so the deviation between the actual sealing force and the expected sealing force given the first and/or second force being applied will be small. Moreover, the torque required to rotate the stem can be measured when the first and/or second force is being applied and this information improves the determination of whether the required sealing force is being applied.

Alternatively, the plugs may have a loose fit into the housing. An advantage of this approach is that the applied first and second forces are direct measurements of the sealing force being applied to by the seats against the ball. However, a loose fit requires a small gap between the plug and the housing and this makes correct alignment of the bellows more difficult.

Another alternative is for the plug of the bellows to be screwed into the housing. An advantage of this approach is that it allows very fine adjustments of the first and/or second forces to be easily made.

For given designs of the components of the ball valve and the technique used to fit the plug into the housing, the first and second forces can be determined either through computer simulation, such as the FEM results presented herein, or by actual measurement on constructed ball valve components.

FIG. 14 shows a method of manufacturing a ball valve according to an embodiment.

In step 1401, the process begins.

In step 1403, the ball of a ball valve is positioned in the housing of the ball valve.

In step 1405, a first metallic bellow is positioned in the housing such that a metallic seat at a first end of the first bellow is in contact with a first side of the ball, wherein the first bellow has a longitudinally elastic property and the seat of the first bellow is integral with the body of first bellow.

In step 1407, a second metallic bellow is positioned in the housing such that a metallic seat at a first end of the second bellow is in contact with a second side of the ball, wherein the second bellow has a longitudinally elastic property and the seat of the second bellow is integral with the body of second bellow.

In step 1409, a force is applied that compresses the first and second bellows.

In step 1411, the second ends of the first and second bellows are welded to the housing when the first and second bellows are under compression, such that, when welded, substantially only the compression of the first and second bellows causes the seats of the first and second bellows to apply a sealing force against the ball; and said sealing force maintains a mechanical seal between each seat and the ball.

In step 1413, the process ends.

Ball valves according to embodiments are particularly suitable for subsea applications and use at depths of 3000 to 5000 m or deeper as they can withstand high internal and external pressures. The valves are also able to operate in a wide range of temperatures, such as −2 to 200 degrees Celsius. In such applications, replacing or maintaining a valve may be very difficult, or not possible, and so valves are required to function without maintenance for a long time, e.g. 20 to 40 years.

The valves may be used to control the flow of high pressure liquids, such as the flow from an oil well, but also can be used for hydraulics and chemical injection in other applications.

Embodiments of the invention include a number of modifications and variations to the embodiments as described above.

Embodiments also include ball valves with a floating ball design. This is a simpler structure than a Trunnion design as there is no anchoring mechanism for securing the ball on an axis perpendicular to the axis of the bore through the ball. Some floating ball valve designs do not require a stem attached between the ball of the ball valve and an external part of the ball valve and the ball of the ball valve and so no secondary seals are required. To open and close the valve, the ball may be rotated by a magnet arrangement or another technique.

In an alternative to the ball valve design shown in FIG. 1, both ends of the stem may protrude from the housing. This allows the ball valve to be operated from two opposite sides.

The welding of each bellow to the housing of the ball valve may be by any of a number of techniques including EB welding and laser welding.

There are a number of classes of torque that can be applied by ROVs. The lowest torque class is a torque of about 70 Nm. ROVs with a torque class of 4 are commercially available and these can apply a torque of about 2711 Nm. ROVs with even higher torque classes are also commercially available. Moreover, embodiments include valves for use on land based applications, such as in the chemical and oil refining industries and do not have the torque restrictions of subsea applications. Embodiments preferably allow use of an ROV with torque class 1 but also include use with ROVs that can apply much larger torques. Accordingly, it is only preferable that the ball valves according to embodiments can be opened and closed by a torque of about 70 Nm and embodiments include ball valves that require much greater torques to be opened and closed.

FIG. 15 is an alternative ball valve design. A difference between the ball valve design shown in FIG. 15 and that discussed above is that only the primary bellows have seats that contact the ball. The secondary bellows are respectively welded to the top and bottom of the ball with the other ends of the secondary bellows forming a mechanical seal with a bushing at the plug. Alternatively, the secondary bellows may be fixed at their plug end and a mechanical seal from at the top of the ball.

The design of ball valve in FIG. 15 is discussed in detail in the priority application of the present application, NO20140624, the entire contents of which are incorporated herein by reference.

The secondary bellows of the ball valve design as shown in FIG. 1 of the present document can be similarly modified according to the technique shown in FIG. 15. That is to say, each of the secondary bellows are connected to the ball and a mechanical seal provided at the other end of the bellows.

Other embodiments of the invention will be apparent to those skilled in the art from consideration of the specification and practice of the embodiments disclosed herein. It is intended that the specification and examples be considered as exemplary only, with a true scope and spirit of the invention being indicated by the following claims. In addition, where this application has listed the steps of a method or procedure in a specific order, it may be possible, or even expedient in certain circumstances, to change the order in which some steps are performed, and it is intended that the particular steps of the method or procedure claims set forth herebelow not be construed as being order-specific unless such order specificity is expressly stated in the claim.

The invention claimed is:

1. A ball valve comprising:
an inlet and an outlet with a flow path for fluid therebetween;
a rotatable ball positioned in the flowpath, wherein the flow of fluid along the flowpath is dependent on the rotation of the ball;
a first bellow arranged between the inlet and the ball, wherein the first bellow is fixed in a housing under compression so that a mechanical seal is maintained between a seat of the first bellow and the ball; and
a second bellow arranged between the outlet and the ball, wherein the second bellow is fixed in the housing under compression so that a mechanical seal is maintained between a seat of the second bellow and the ball;
a stem that extends from first and second sides of the ball;
a third bellow arranged around the stem extending from the first side of the ball, wherein the third bellow has an integral seat in contact with the ball; and
a fourth bellow arranged around the stem extending from the second side of the ball, wherein the fourth bellow has an integral seat in contact with the ball;
wherein the third and fourth bellows have longitudinally elastic properties and are fixed in the housing under compression such that the compression in the third and fourth bellows ensures a mechanical seal between the seats of the third and fourth bellows and the ball;
wherein at least the third bellow comprises a polymeric material seal between the stem and a plug of the third bellow and the stem extends through the polymeric material seal out of the housing;
wherein the polymeric material seal is arranged in the housing so that fluid from the main flow path can only reach the polymeric material seal if the fluid leaks across at least the mechanical seal between the seat of the third bellow and the ball;
wherein each of the first and second bellows comprises: a seat, which is metallic, at an end of the bellow for providing a contact surface with the ball of the ball valve; and
a metallic body integral with the seat;
wherein the metallic body has a longitudinally elastic property such that substantially only the compression in the bellow causes the seat to apply a sealing force against the ball of the ball valve that maintains a mechanical seal between the seat and the ball of the ball valve; and
wherein the bellow further comprises an integral plug, at an opposite end of the bellow to the seal, the plug being Electron Beam or laser welded to the exterior of the housing of the ball valve.

2. The ball valve according to claim 1, wherein the only manufactured components in the housing of the ball valve that are configured to force the seats of the first and second bellows against the ball are the first and second bellows.

3. The ball valve according to claim 1, wherein for each of the first and second bellows, a cross-section of the bellow comprises a series of linear sections connected to each other by 90 degree turns, wherein a first thickness of a linear section aligned along a longitudinal axis of the bellow is 1.5 mm, a second thickness of a linear section aligned perpendicular to the longitudinal axis of the bellow is 1.2 mm, the spacing between linear sections aligned perpendicular to the longitudinal axis of the bellow is 2 mm and the spacing between linear sections aligned along the longitudinal axis of the bellow is 4 mm.

4. The ball valve according to claim 1,
wherein the housing, first, second, third and fourth bellows and ball are made from an austenite nickel-chromium-based superalloy; and
wherein the first, second, third and fourth bellows are fixed to the housing by Electron Beam or laser welding.

5. The ball valve according to claim 1, wherein the torque required to rotate ball is 400 Nm or less under all operating conditions of the ball valve.

6. A method of manufacturing a ball valve, the method comprising:
positioning a ball of a ball valve in a housing of the ball valve;
positioning a first bellow, which is metallic, in the housing such that a seat, which is metallic, at a first end of the first bellow is in contact with a first side of the ball, wherein the first bellow has a longitudinally elastic property and the seat of the first bellow is integral with the body of first bellow;

positioning a second bellow, which is metallic, in the housing such that a seat, which is metallic, at a first end of the second bellow is in contact with a second side of the ball, wherein the second bellow has a longitudinally elastic property and the seat of the second bellow is integral with the body of second bellow;

applying a force that compresses the first and second bellows; and welding the second ends of the first and second bellows to the housing when the first and second bellows are under compression, such that, when welded, substantially only the compression of the first and second bellows causes the seats of the first and second bellows to apply a sealing force against the ball; and said sealing force maintains a mechanical seal between each seat and the ball;

wherein said second ends of the first and second bellows each comprise an integral plug, at the opposite end of the bellow to the seat; and said welding the second ends of the first and second bellows to the housing comprises Electron Beam or laser welding each plug of the first and second bellows to the exterior of the housing;

the method further comprising:

positioning a third bellow, which is metallic, in the housing such that a seat, which is metallic, at a first end of the third bellow is in contact with a third side of the ball, wherein the third bellow has a longitudinally elastic property and the seat of the third bellow is integral with a body of the third bellow;

positioning a fourth bellow, which is metallic, in the housing such that a metallic seat at a first end of the fourth bellow is in contact with a fourth side of the ball, wherein the fourth bellow has a longitudinally elastic property and the seat of the fourth bellow is integral with a body of the fourth bellow;

applying a force that compresses the third and fourth bellows; and welding the second ends of the third and fourth bellows to the housing when the third and fourth bellows are under compression, such that, when welded, substantially only the compression of the third and fourth bellows causes the seats of the third and fourth bellows to apply a second sealing force against the ball; and said second sealing force maintains a mechanical seal between each seat of the third and fourth bellows and the ball;

wherein the first and second bellows are arranged co-linearly with each other;

the third and fourth bellows are arranged co-linearly with each other; and the longitudinal axes of the third and fourth bellows are perpendicular to the longitudinal axes of the first and second bellows; and wherein the third bellow is arranged around a stem that extends from the ball and a polymeric material seal is provided such that fluid from the main flow path through the ball valve can only reach the polymeric material seal if the fluid leaks across the mechanical seal between the seat of the third bellow and the ball.

7. The method according to claim 6, further comprising:
turning the ball of the ball valve when the first and second bellows are under compression; and
determining to weld the first and second bellows to the housing in dependence on a torque required to turn the ball valve being within a desired range of torque values.

8. The method according to claim 6, further comprising:
repeatedly changing the applied force to compress the first and second bellows and measuring the torque required to turn the ball of the ball valve until a measured torque has a predetermined value.

9. The method according to claim 6, wherein the third and fourth bellows are positioned in the housing and compressed prior to the first and second bellows being positioned in the housing and compressed.

10. The method according to claim 6, wherein, other than the first and second bellows, the method does not comprise providing any other components in the housing for contributing to the applied sealing force between the seats of the first and second bellows and the ball.

11. A ball valve manufactured according to the method of claim 6.

12. The method according to claim 6, further comprising:
turning the ball of the ball valve when the third and fourth bellows are under compression; and
determining to weld the third and fourth bellows to the housing in dependence on a torque required to turn the ball valve being within a desired range of torque values.

13. The method according to claim 12, further comprising:
repeatedly changing the applied force to compress the third and fourth bellows and measuring the torque required to turn the ball of the ball valve until the measured torque has a predetermined value.

* * * * *